US012335145B2

(12) United States Patent
Addaguduru et al.

(10) Patent No.: US 12,335,145 B2
(45) Date of Patent: Jun. 17, 2025

(54) SYSTEMS AND METHODS FOR IMPROVING FUNCTIONALITY AND REMOTE MANAGEMENT OF COMPUTING RESOURCES DEPLOYED IN A CONTROLLED HIERARCHICAL NETWORK

(71) Applicant: Microsoft Technology Licensing, LLC, Redmond, WA (US)

(72) Inventors: Chandra Mouli Addaguduru, Bangalore (IN); Phalgun Garimella, Hyderabad (IN); Krupesh Satishkumar Dhruva, Hyderabad (IN); Narasimha Rao Karumanchi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 17/966,547

(22) Filed: Oct. 14, 2022

(65) Prior Publication Data

US 2024/0129317 A1    Apr. 18, 2024

(51) Int. Cl.
*H04L 47/12* (2022.01)
*G06F 8/65* (2018.01)
(Continued)

(52) U.S. Cl.
CPC .............. *H04L 47/12* (2013.01); *G06F 8/65* (2013.01); *G06F 11/2097* (2013.01);
(Continued)

(58) Field of Classification Search
CPC ....... H04L 47/12; H04L 47/18; H04L 47/263; H04L 47/30; H04L 47/39; H04L 67/10;
(Continued)

(56) References Cited

U.S. PATENT DOCUMENTS 10,250,619 B1 * 4/2019 Park .................. H04L 63/18
11,848,857 B1 * 12/2023 Griffin ............... H04L 67/10
(Continued)

FOREIGN PATENT DOCUMENTS

WO    WO-2012062365 A1 *  5/2012 ............ H04L 47/12

OTHER PUBLICATIONS

"Annotations", Retrieved From: https://web.archive.org/web/20181005084954/https://kubernetes.github.io/ingress-nginx/user-guide/nginx-configuration/annotations/, Oct. 5, 2018, 20 Pages.
"Multi TLS certificate termination", Retrieved from: https://web.archive.org/web/20220421150959/https://kubernetes.github.io/ingress-nginx/examples/multi-tls/, Apr. 21, 2022, 2 Pages.
(Continued)

*Primary Examiner* — Kyung H Shin
(74) *Attorney, Agent, or Firm* — Ray Quinney & Nebeker; Christopher K. Hallstrom

(57) ABSTRACT

The present disclosure relates to utilizing a hierarchical network communication system to efficiently manage and monitor a controlled hierarchical network. In particular, the hierarchical network communication system utilizes gateway services embedded among various architecture levels of a controlled hierarchical network to facilitate secure communications between levels of the hierarchical network as well as with an authorized external computing device or computing system. In various instances, the gateway service includes various components and elements that facilitate inter-network level communication as well as remote management, including monitoring, configuring, and upgrading components and resources at each level of the controlled hierarchical network. Indeed, the hierarchical network communication system facilitates the remote management of a controlled hierarchical network while upholding the strict security and communication protocols required for networks adhering to the Purdue Reference Architecture Model, ISA-95 standards, and ISA-99 standards.

20 Claims, 11 Drawing Sheets

(51) Int. Cl.
*G06F 11/20* (2006.01)
*G06F 21/57* (2013.01)
*H04L 9/40* (2022.01)
*H04L 41/044* (2022.01)
*H04L 67/10* (2022.01)

(52) U.S. Cl.
CPC ............ *G06F 21/57* (2013.01); *H04L 41/044* (2013.01); *H04L 63/0236* (2013.01); *H04L 63/0823* (2013.01); *H04L 63/102* (2013.01); *H04L 63/18* (2013.01); *H04L 67/10* (2013.01)

(58) Field of Classification Search
CPC ... H04L 45/302; H04L 67/561; H04L 45/123; H04L 63/18; H04L 63/16; H04L 63/0428; H04L 63/1416; H04L 63/0272; H04L 63/20; G06F 8/65; G06F 16/212; G06F 16/214; G06F 16/213; G06F 8/71; G06F 21/57; G06F 21/52; G06F 9/544; G06F 21/629; G06F 21/552; G06F 11/2097; G06F 9/455; G06F 9/546; G06F 21/53; G06F 11/1469; G06F 11/1433; G06F 11/2094; G06F 9/4881; G06F 9/4843; G06F 9/5005; G06F 8/63; G06F 9/5072; G06F 8/60; G06F 11/1453
See application file for complete search history.

(56) References Cited

U.S. PATENT DOCUMENTS

| | | | |
|---|---|---|---|
| 2022/0222335 A1* | 7/2022 | Bosch | G06F 21/57 |
| 2022/0350642 A1* | 11/2022 | Poddar | G06F 11/2097 |
| 2023/0132690 A1* | 5/2023 | Wojcik | G06F 8/65 |
| | | | 717/170 |

OTHER PUBLICATIONS

Nelson, Rick, "NGINX as a WebSocket Proxy", Retrieved from: https://www.nginx.com/blog/websocket-nginx/, May 16, 2014, 6 Pages.

International Search Report and Written Opinion received for PCT Application No. PCT/US2023/031793, mailed on Jan. 29, 2024, 19 pages.

Musser Marc: "Modern Industrial Manufacturing with Oracle and IBM", Retrieved from the Internet: URL: https://www.ibm.com/downloads/cas/3RVQEVPX, Dec. 31, 2021, pp. 1-15.

Saye Kevin, "Deep Dive: Creating hierarchies of Azure IoT Edge devices (ISA-95)—Part 1", Retrieved from the Internet: URL: https://kevinsaye.wordpress.com/2021/07/15/, Jul. 15, 2021, pp. 1-11.

Saye Kevin, "Deep Dive: Creating Hierarchies of Azure IoT Edge devices (ISA-95)—Part 2", Retrieved from the Internet: URL: https://kevinsaye.wordpress.com/2021/07/20/, Jul. 20, 2021, pp. 1-21.

Saye Kevin, "Deep Dive: Creating Hierarchies of Azure IoT Edge devices (ISA-95)—Part 3", Retrieved from the Internet: URL: https://kevinsaye.wordpress.com/2021/07/21/, Jul. 21, 2021, pp. 1-16.

Saye Kevin, "IoT Edge Nested Hierarchy (ISA-95): Understanding the Security, Network Ports and Protocols", Retrieved from the Internet: URL: https://kevinsaye.wordpress.com/2022/05/31/iot-edge-nested-hierarchy-isa-95-understanding-the-security-network-ports-and-protocols/, May 31, 2022, pp. 1-7.

Web Services Amazon: "Security Best Practices for Manufacturing OT", Retrieved from the Internet: URL: https://d1.awsstatic.com/whitepapers/security-bp-for-manufacturing-ot.pdf, May 20, 2021, pp. 1-35.

International Preliminary Report on Patentability received for PCT Application No. PCT/US23/031793, mailed on Apr. 24, 2025, 12 pages.

\* cited by examiner

SYSTEMS AND METHODS FOR IMPROVING FUNCTIONALITY AND REMOTE MANAGEMENT OF COMPUTING RESOURCES DEPLOYED IN A CONTROLLED HIERARCHICAL NETWORK

BACKGROUND

Controlled hierarchical networks are commonly found in manufacturing industries, such as those in the Internet of Things (IoT) manufacturing space. Controlled hierarchical networks have a network architecture that includes multiple levels or layers that each perform different tasks. For example, controlled hierarchical networks follow a Purdue Reference Architecture Model for network architecture where each level is independent of the other levels and only the top level is connected to the computing devices outside of the network (e.g., the internet). Often a controlled hierarchical network forms part or all of an industrial control system (ICS) for an entity.

While controlled hierarchical networks provide several advantages, such as preventing unauthorized access to resources on lower network levels, existing computer systems that implement controlled hierarchical networks still suffer from significant inefficiencies, inaccuracies, and inflexibilities regarding monitoring and managing controlled hierarchical networks.

To illustrate, when an external cloud computing system is connected to a controlled hierarchical network, the cloud computing system is able to communicate, in a limited capacity, with the top level of the controlled hierarchical network, but is unable to access computing devices, components, services, or resources on the other levels. Thus, the cloud computing system is unable to observe or access data from the resources and services on the lower levels. This lack of resource observability is a result of the rigid requirements of controlled hierarchical networks and often results in inaccurate and inefficient operations by cloud computing systems that rely on this hidden data to operate. Indeed, in its current architecture state, cloud computing systems are unable to see data as it passes across the lower network levels of the controlled hierarchical network.

As another example, because of the access restrictions of a controlled hierarchical network, cloud computing systems are unable to update or otherwise manage computing devices, components, services, and resources of the controlled hierarchical network. Rather, a user, such as a system administrator of the controlled hierarchical network, must manually implement each update, which is inefficient, especially when a network level includes a large number of computing devices, services, and/or resources (often numbering in the millions). This is further exacerbated when one or more of the network levels include Kubernetes clusters.

In many instances, a computing device on a lower level needs to pass data to an external source or receive requested data from the external source. The current architecture of controlled hierarchical networks prevents this type of open communication as it violates security measures and protocols of the controlled environment. Accordingly, various existing computer systems negate the security measures of the controlled hierarchical network by setting up backdoor proxies between the lower network levels and external devices.

Some existing computer systems set up unsecure proxies between network levels to bypass network security protocols that prevent interlevel communication and freely let data pass between levels. Indeed, in these instances, data passes between levels insecurely and violates policies and protocols that protect computing devices and resources of the controlled hierarchical network. Further, in order to pass data from a lower level to a higher level, a user must manually write and edit scripts to open endpoints (e.g., ports and/or internet protocol (IP) addresses) at each higher level so that the data passes through proxies on each level. Because controlled hierarchical networks often have hundreds of devices on lower levels and because the endpoints frequently change, this approach is infeasible, extremely inefficient, and often prone to inaccurate user errors (e.g., the proxy has incorrect address information at one of the many network levels). Additionally, even in these cases, endpoints need to be manually added and removed (which often does not happen) frequently at each level (e.g., each level would require a proxy). Alternatively, in some cases, to bypass frequent updates, a user opens up a wide range of endpoints, which further violates the security measures of the controlled hierarchical network.

These and other problems result in significant inefficiencies, inaccuracies, and inflexibilities of existing systems managing, updating, and observing devices on controlled hierarchical networks.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
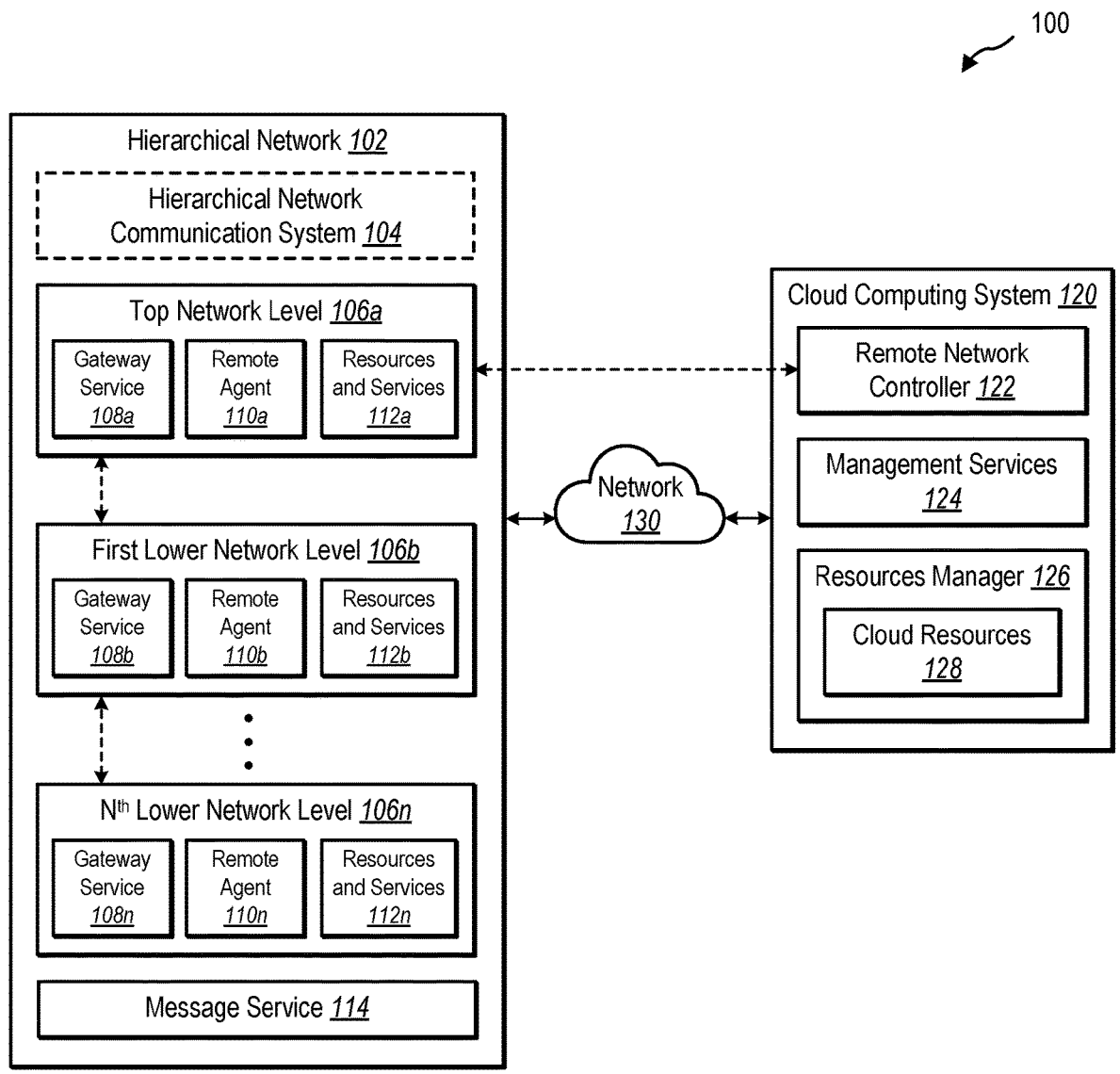
FIGS. 1A-1B illustrate an example overview of a controlled hierarchical network communication system for managing and observing network levels of a controlled hierarchical network in accordance with one or more implementations.

Implementations of the present disclosure provide benefits and/or solve one or more of the foregoing or other problems in the art with devices, systems, and/or methods that utilize a hierarchical network communication system (i.e., a controlled hierarchical network communication system) to efficiently manage and monitor a controlled hierarchical network (hereinafter "hierarchical network"). In particular, the hierarchical network communication system utilizes gateway services embedded among various levels of a hierarchical network to facilitate secure communications between levels of the hierarchical network as well as with an authorized external computing device or computing system. For example, the gateway service includes various components and elements that facilitate inter-network level communication as well as remote management, including monitoring, configuring, and upgrading components and resources at each level of the hierarchical network. Indeed, the hierarchical network communication system facilitates remote management of a hierarchical network while upholding the strict security and communication standards required for networks adhering to the Purdue Reference Architecture Model (or simply the "Purdue Model"), ISA-95 standards, and ISA-99 standards.

As a non-limiting example, suppose a hierarchical network adheres to the Purdue Model and includes a Kubernetes cluster at each network level. Additionally, the top network level includes a remote agent pod for onboarding it with a cloud computing system. Accordingly, the hierarchical network communication system adds an application programming interface (API) gateway pod (i.e., gateway service) to the network levels that facilitates secure communications between levels as well as onboarding of the lower network levels. For example, each API gateway pod includes various components, such as an ingress controller, a domain name service (DNS) configuration manager, messaging publication and subscription lists, and a resource control plane for managing local network level resources as well as facilitating secure communications with adjacent network levels (and with the remote cloud computing system via the top network level).

With respect to the hierarchical network communication system, in one or more implementations, the hierarchical network communication system generates gateway services at multiple levels of a hierarchical network that includes at least a top network level and a lower network level, which are isolated from each other and where only the top network level communicates with computer devices outside of the hierarchical network. In these implementations, the hierarchical network communication system detects a request from a service on the lower network level to send (or access) data to an external computing device that is not part of the hierarchical network and, in response, the hierarchical network communication system adds an endpoint (e.g., address) corresponding to the external computing device to a first gateway service on the lower network level. Additionally, the hierarchical network communication system receives, from the first gateway service, a message at a second gateway service on the top network level to automatically add the endpoint to the top network level. With the endpoint added to the network levels of the hierarchical network, the hierarchical network communication system provides data from the first gateway service to the second gateway service via a first secure connection and from the second gateway service to the external computing device via a second secure connection.

As described herein, the hierarchical network communication system provides several technical benefits in terms of computing efficiency, accuracy, and flexibility compared to existing computing systems. Indeed, the hierarchical network communication system provides several practical applications that deliver benefits and/or solve problems associated with hierarchical networks.

To elaborate, in various implementations, the hierarchical network communication system improves efficiency, accuracy, and flexibility by utilizing a gateway service that facilitates secure monitoring and management at multiple network levels of a hierarchical network (i.e., a controlled hierarchical network). For example, in various implementations, when network levels of a hierarchical network are onboarded to a cloud computing system, the hierarchical network communication system also adds a gateway service. In various implementations, the gateway service allows for a cloud computing system to remotely manage resources and services on lower network levels of the hierarchical network in a secure manner that complies with the Purdue Model, ISA-95, and ISA-99 standards (hereafter referred to as "Purdue Model security standards"), which include isolation, control, observability, and auditability.

In various implementations, a gateway service includes various components and elements that facilitate efficient, accurate, and flexible communications between lower levels of a hierarchical network and a cloud computing system. For example, a gateway service includes an ingress controller, a DNS configuration manager, a messaging publication and subscription list (or simply a "messaging list"), and/or a resource control plane. As shown below, the hierarchical network communication system utilizes these components and elements to allow the cloud computing system to securely monitor and manage resources and services across multiple architectural network layers of the hierarchical network. Indeed, the hierarchical network communication system facilitates bulk configuration changes at all network levels of a hierarchical network (e.g., if an endpoint is compromised, the hierarchical network communication system quickly, efficiently, and accurately modifies the endpoint at all network levels to remove or denylist the compromised endpoint).

To illustrate, in various instances, the hierarchical network communication system utilizes an ingress controller to forward incoming messages between gateway services on adjacent network levels of the hierarchical network (rather than to services on the same network level as is the case with existing computer systems). In some instances, the hierarchical network communication system utilizes the DNS configuration manager to determine when an incoming message from another gateway service on another network level of the hierarchical network corresponds to an external service or endpoint or to a gateway service of another network level. For example, the hierarchical network communication system resolves service data to a gateway service on an adjacent lower network level to ensure that Purdue Model security standards are upheld. In one or more instances, the messaging list functions in connection with an event grid or messaging queue that allows for inter-network level messages and/or messages from the cloud computing system.

Additionally, in various implementations, the hierarchical network communication system utilizes a resource control plane that includes an automatically updated list of authorized endpoints for services running on the lower network level of the hierarchical network. Indeed, the hierarchical network communication system efficiently, accurately, and automatically updates (e.g., adds, remotes, and modifies) endpoints as needed at each level to allow for data to securely pass from lower network levels upwards as well as enable the cloud computing system to monitor, manage, and upgrade services at lower network levels of the hierarchical network.

As mentioned above, unlike many existing computer systems that add unsecure proxies to levels of a hierarchical network, the hierarchical network communication system upholds Purdue Model security standards. For example, the hierarchical network communication system utilizes a gateway service on one network level to form a transport security layer (TLS) encryption link with the gateway service on an adjacent network level before transferring data between levels. Additionally, in many implementations, the hierarchical network communication system generates, applies, and/or updates signed authentication certificates between inter-network level communications.

As noted above, the hierarchical network communication system facilitates remote management. For example, in various implementations, the hierarchical network communication system facilitates an external cloud computing system to perform update management, life cycle management, application deployments, and upgrades to services and resources across all network levels. Indeed, the hierarchical network communication system provides long-term management of a hierarchical network from an authorized cloud computing system. Additionally, the hierarchical network communication system facilitates a cloud computing system to observe, inspect, and audit data as it securely enters and leaves each network level (e.g., at a TLS termination point of a gateway service), which effectively allows for malicious activities to be quickly detected and blocked.

As illustrated in the foregoing discussion, the present disclosure utilizes a variety of terms to describe the features and advantages of one or more implementations described herein. For instance, as used herein, the terms "controlled hierarchical network" (or simply "hierarchical network") refer to a computing network that includes multiple controlled network architectural network layers or levels, where the network levels are separate from each other and only the top network level is connected to computing devices outside of the hierarchical network (e.g., only the top network level has a line-of-sight connection with an external device). As referred to in this document, a hierarchical network is a Purdue Model network or is a network that adheres to a Purdue Reference Architecture Model, ISA-95, or ISA-99 standards. Commonly, hierarchical networks are found in manufacturing industries and are part of an industrial control system (ICS), such as those in the Internet of Things (IoT) manufacturing space.

Additionally, a hierarchical network has multiple architectural network layers or levels that commonly perform different functions, including at least a top network level and one or more lower network levels. As used herein, a top network level refers to the network level of a hierarchical network that has access to networks and/or computing devices outside of the hierarchical network. A lower network level refers to a network level of a hierarchical network that does not have access to external networks or computing devices and that is isolated from other network levels of the hierarchical network. Additionally, as noted, in many instances, one or more layers of a hierarchical network include Kubernetes clusters for providing resources and performing services.

As used herein, the term "external computing device" refers to a computing device that resides apart from a hierarchical network. In various implementations, an external computing device communicates with components of a hierarchical network via the internet or another communication network. In many implementations, an external computing device is part of a cloud computing system.

As used herein, the term "cloud computing system" refers to a network of connected computing devices (e.g., network devices) that provide various services to computing devices. For instance, a cloud computing system can be a distributed computing system that includes a collection of physical server devices (e.g., server nodes) organized in an organized structure including computing zones, clusters, virtual local area networks (VLANs), racks, load balancers, fault domains, etc. In various implementations, a cloud computing system includes external computing devices (e.g., computing devices located outside of a controlled hierarchical network). In some instances, a cloud computing system provides services for managing and/or complementing controlled hierarchical networks, especially when the controlled hierarchical network includes Kubernetes clusters.

As mentioned above, a hierarchical network can include services and resources, particularly when part of a Kubernetes cluster. As used herein, the terms "service" or "compute service" refer to hardware or software components for processing data according to a goal or design. When part of a Kubernetes cluster, a service includes a logical collection of pods that work together to process data. As used herein, the term "resource" refers to components on a network level that store, process, provide, and/or otherwise manage data. When part of a Kubernetes cluster, a resource includes endpoints that allow objects (e.g., API objects) to be stored and accessed. Often, resources are associated with Kubernetes pods in a Kubernetes cluster.

As used herein, the term "endpoint" refers to an address used by an object, service, resource, device, or Kubernetes pod. For example, an endpoint is a resource that tracks the IP address (and the port) of a dynamically assigned object or Kubernetes pod. When part of a Kubernetes cluster, an endpoint works as a service selector and points to resources for a service to access. In other words, endpoints provide a way to access a resource used by a service. In some instances, endpoints are within a hierarchical network. In other instances, endpoints refer to external computing devices.

As used herein, the term "gateway service" refers to a service on a network level that provides secure communications between network levels of a hierarchical network. In various implementations, a gateway service on a given network level allows a service on the same network level to call an endpoint on another network level or outside of the hierarchical network. In some implementations, a gateway service is an API gateway pod, such as in the context of a Kubernetes cluster. As described, a gateway service includes an ingress controller, a DNS configuration manager, a messaging publication and subscription list, and/or a resource control plane that includes access management (e.g., an automatically updated list of authorized endpoints for services running on the lower network level of the hierarchical network).

As used herein, the term "secure connection" refers to a link between two termination points that is protected from outside inspection. Examples of a secure connection include a TLS connection between two gateway services on different network levels of a hierarchical network. In various implementations, a secure connection includes encrypting and decrypting data at the termination points. In various implementations, a secure connection utilizes secure signed certificates (e.g., secure socket layer (SSL) certificates) to cryptographically link a component with encryption keys.

As used herein, the term "control message" refers to a message provided to a component and/or service to relay configuration and/or settings information. For example, various services and/or components subscribe to a message topic and when a control message is published to a message queue or event grid, each subscribing service and/or component receives a copy of the control message. For example, one or more services or components in a hierarchical network maintain a messaging publication and subscription list (or simply "message list") to track control message communications. In a hierarchical network, components and/or services on different network levels can subscribe to the same message queue or event grid.

Figure 1B:
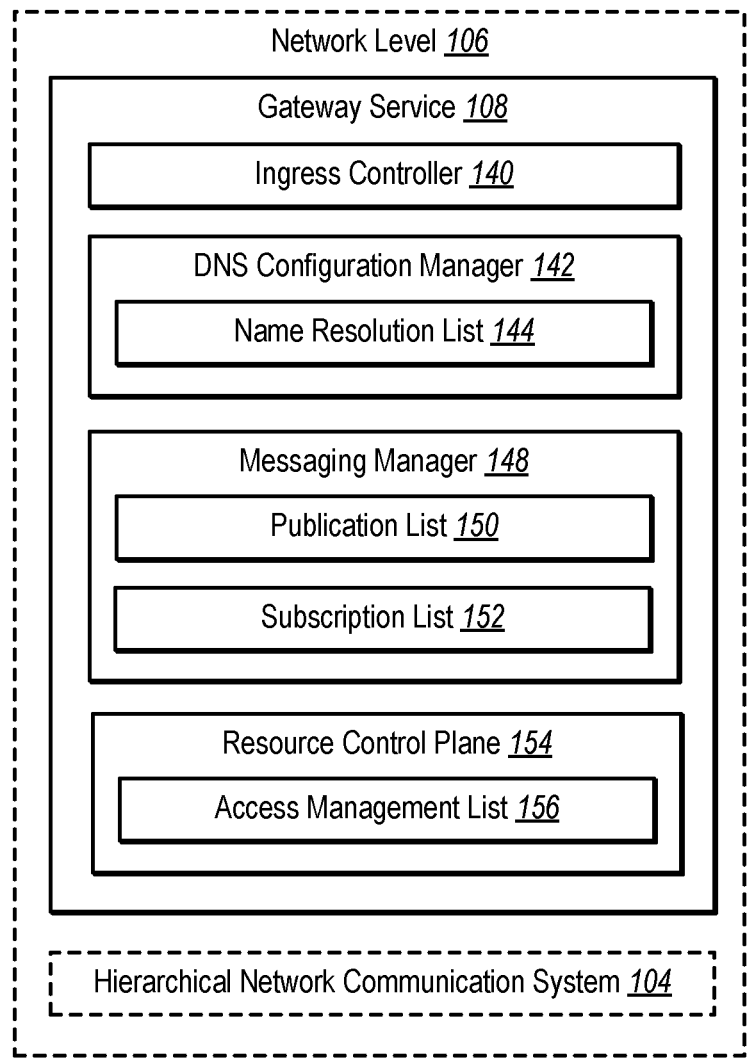

Additional details will now be provided regarding the components and elements of the hierarchical network communication system (i.e., a controlled hierarchical network communication system). To illustrate, FIGS. 1A-1B illustrate an example overview of an environment 100 (i.e., a digital medium system environment) for implementing a hierarchical network communication system 104 on a hierarchical network 102 (i.e., a controlled hierarchical network). In particular, FIG. 1A includes the environment 100 and FIG. 1B provides more detail regarding the hierarchical network communication system 104.

As shown, FIG. 1A includes a hierarchical network 102 having multiple network levels, a cloud computing system 120 having various components, and a network 130, which provides a potential connection between the hierarchical network 102 and the cloud computing system 120. Additional details regarding computing devices and networks, such as those associated with the hierarchical network 102, the cloud computing system 120, and the network 130 are provided below in connection with FIG. 9.

As mentioned above, FIG. 1A shows the hierarchical network 102. The hierarchical network 102 includes the hierarchical network communication system 104, network levels (i.e., network layers), and a message service 114. The network levels include a top network level 106a, a first lower network level 106b, and an $N^{th}$ lower network level 106n. The hierarchical network 102 can include more network levels than shown where each network level is separate from the other network levels.

In various implementations, the hierarchical network communication system 104 is located on one or more of the network levels. In some implementations, the hierarchical network communication system 104 is located outside of the network levels. Accordingly, the hierarchical network communication system 104 is shown with dashed lines to represent that it can be centrally located or distributed across various network levels of the hierarchical network 102. In some implementations, some of the hierarchical network communication system 104 is located on an external device or system, such as the cloud computing system 120.

As described in this document, the hierarchical network communication system 104 facilitates an external computing system, such as the cloud computing system 120, to remotely monitor and manage the hierarchical network 102, including accessing the lower network levels, while upholding Purdue Model security standards for the hierarchical network 102, as provided below. Additionally, as further described below, the hierarchical network communication system 104 utilizes various components, services, and functions to automate the process of adding, removing, and modifying endpoints needed by services across multiple network levels of the hierarchical network 102.

Additionally, as shown, each network level includes a gateway service associated with the hierarchical network communication system 104, a remote agent, and a set of resources and services. As shown, the top network level 106a includes a first gateway service 108a, a first remote agent 110a, and a first set of resources and services 112a; the first lower network level 106b includes a second gateway service 108b, a second remote agent 110b, and a second set of resources and services 112b; and the $N^{th}$ lower network level 106n includes an $n^{th}$ gateway service 108n, an $n^{th}$ remote agent 110n, and an $n^{th}$ set of resources and services 112n.

In various implementations, the gateway services provide secure inter-network level communications, including allowing endpoint connections to travel across lower network levels to the top network level 106a and, in some cases, to an external computing device, such as a device on the cloud computing system 120. Additional details regarding gateway services are provided below in connection with FIG. 1B.

Additionally, in one or more implementations, the network levels include remote agents. In various implementations, the remote agents provide an interface that allows the cloud computing system 120 to connect with the hierarchical network 102. For example, the remote agents interface with a remote network controller 122 on the cloud computing system 120 to activate service controls on different network levels of the hierarchical network 102. In some implementations, the remote agents and the gateway services on each network level work together to provide network information to the cloud computing system 120. A more detailed example of remote agents is provided below in connection with FIG. 2.

Further, as shown, each network level includes a set of resources and services. In some implementations, the set of resources and services includes associated components and devices. In various implementations, the set of resources and services are specific to a network level. For instance, for a base lower network level that includes processes (e.g., sensors and actuators), the set of resources and services correspond to managing and supporting these components. For another lower network level that includes site operations or area controls, the set of resources and services correspond to supporting these components.

As shown, the hierarchical network 102 includes the message service 114. In various implementations, the message service 114 provides messages, such as control messages, to services within the different network levels. For example, a gateway service publishes control messages via the message service 114 to inform other gateway services of configuration changes that need to occur at different network levels for a service to reach, access, or otherwise communicate with a target endpoint. In some implementations, devices, such as IoT devices, use the message service 114 to send data and communications within the network levels (e.g., via MQTT or Kafka messaging protocols). Additional description regarding control messages and message services is provided below in connection with FIG. 5. In some implementations, the cloud computing system 120 also subscribes to the message service 114, as also described below.

As shown, the cloud computing system 120 includes a remote network controller 122, management services 124, and a resource manager 126 having cloud resources 128. While a limited number of components are shown, the cloud computing system 120 can include additional or different components, computing devices, network devices, etc.

Additionally, in various implementations, the cloud computing system 120 fulfills requests by providing various services and functions.

In some implementations, the remote network controller 122 communicates with remote agents on the hierarchical network 102 to incorporate the hierarchical network 102 into the cloud computing system 120. For example, if the hierarchical network 102 is hosted by a different entity than the cloud computing system 120, the cloud computing system 120 utilizes the remote network controller 122 and the remote agents to access and control the hierarchical network 102 via the cloud computing system 120, as if the hierarchical network 102 was part of the cloud computing system 120.

Among various implementations, the management services 124 provides services for managing the hierarchical network 102. For example, the management services 124 provides graphical user interfaces and/or other user controls for operating the sets of resources and services on the hierarchical network 102. In additional implementations, the management services 124 allows users to securely monitor and inspect data as it passes between network levels on the hierarchical network 102. In some implementations, the management services 124 provide other services of the cloud computing system 120 that are unrelated to the hierarchical network 102.

In various implementations, the resource manager 126 and the cloud resources 128 provide resources and services offered by the cloud computing system 120. For example, the cloud resources 128 serve as one or more endpoints for services on the hierarchical network 102. Additionally, the resource manager 126 and the cloud resources 128 can provide resources apart from the hierarchical network 102.

While FIG. 1A illustrates a specific arrangement of networks and systems, different arrangements are possible. Additionally, the environment 100 can include any number of computing devices, networks, and/or systems that communicate with each other. For example, while the hierarchical network 102 is shown communicating with the cloud computing system 120 via the network 130, in some implementations, the hierarchical network 102 communicates directly with the cloud computing system 120, bypassing the network 130, as shown by the dashed line (e.g., a direct or dedicated connection or network tunnel).

As mentioned above, FIG. 1B provides additional details regarding gateway services. As illustrated, FIG. 1B shows a gateway service 108 on a network level 106, which represents one of the network levels of the hierarchical network 102 shown in FIG. 1A. For example, the dashed lines of the network level 106 indicate that it represents one or more of the network levels described above. Additionally, as shown in FIG. 1B, the network level 106 includes the hierarchical network communication system 104 (or at least a part of it). As noted above, in various instances, the hierarchical network communication system 104 facilitates implementing a gateway service on multiple network levels of a hierarchical network.

As shown, the gateway service 108 includes an ingress controller 140, a DNS configuration manager 142, a messaging manager 148, and a resource control plane 154. The gateway service 108 can include additional or different components. As also shown, the DNS configuration manager 142 includes a name resolution list 144, the messaging manager 148 includes a publication list 150 and a subscription list 152, and the resource control plane 154 includes an access management list 156.

As mentioned, the gateway service 108 includes the ingress controller 140. In various implementations, the ingress controller 140 forwards incoming data between gateway services on different network levels of the hierarchical network as well as controls data traffic on the gateway service (e.g., controls the traffic API gateway). For example, an ingress controller commonly receives data provided to a network level and forwards the data to services on the same network level. However, in various implementations, the hierarchical network communication system 104 utilizes the ingress controller 140 to forward authorized data on lower network levels to adjacent network levels (e.g., to a gateway service on another network level). In some implementations, the hierarchical network communication system 104 utilizes the ingress controller 140 to forward authorized pieces of data on a top network level to an external computing device. In certain implementations, the ingress controller 140 is an NGINX or another type of proxy server. Additional details regarding ingress controllers are provided below in connection with FIG. 6.

As shown, the gateway service 108 includes the DNS configuration manager 142. In various implementations, the DNS configuration manager 142 determines when an incoming piece of data from another gateway service on another network level of the hierarchical network corresponds to an external service. For example, the DNS configuration manager 142 analyzes the endpoint and/or namespace of incoming data and determines if the piece of data is to be routed to a service on the same level or passed to another network level. In the latter case, the DNS resolves the data to be directed to an adjacent network level. Additional details regarding DNS configuration managers are provided below in connection with FIG. 4 and FIG. 6.

As shown, the gateway service 108 includes the messaging manager 148. In various implementations, the messaging manager 148 maintains a messaging publication and subscription list (shown as the publication list 150 and the subscription list 152). In various implementations, the messaging lists indicate which control messages to read from a message queue or event grid as well as writing control messages to a message queue or event grid. For example, the messaging manager 148 handles the receiving and sending of control messages from the gateway service 108. In some implementations, the messaging manager 148 operates in connection with the messaging service described above. Additional details regarding control messages and changing configuration settings of gateway services are provided below in connection with FIG. 4 and FIG. 5.

As shown, the gateway service 108 includes the resource control plane 154. In various implementations, the resource control plane 154 authenticates data and/or messages that arrive at the gateway service 108. For example, the resource control plane 154 provides endpoint management and configuration updates for DNS resolutions (e.g., in connection with the DNS configuration manager 142). For instance, the resource control plane 154 automatically enables DNS resolution for authorized endpoints. In this manner, the resource control plane 154 provides automated long-term access control of resources in an efficient and secure manner.

To elaborate, as shown, the resource control plane 154 includes the access management list 156. In various implementations, the access management list 156 is a configuration file that includes an allowlist and denylist of endpoints that are allowed to pass through the gateway service 108 (e.g., the access management list 156 serves as role-based access control (RBAC) rules). In various implementations, the hierarchical network communication system 104 dynamically and automatically updates the access management list 156 to include (or modify) authorized endpoints for services running on the lower network level of the hierarchical network updates (or to remove newly unauthorized endpoints). Additional details regarding automatically maintaining a list of authorized endpoints (e.g., the access management list 156) are provided below in connection with FIGS. 3A-6.

Figure 2:
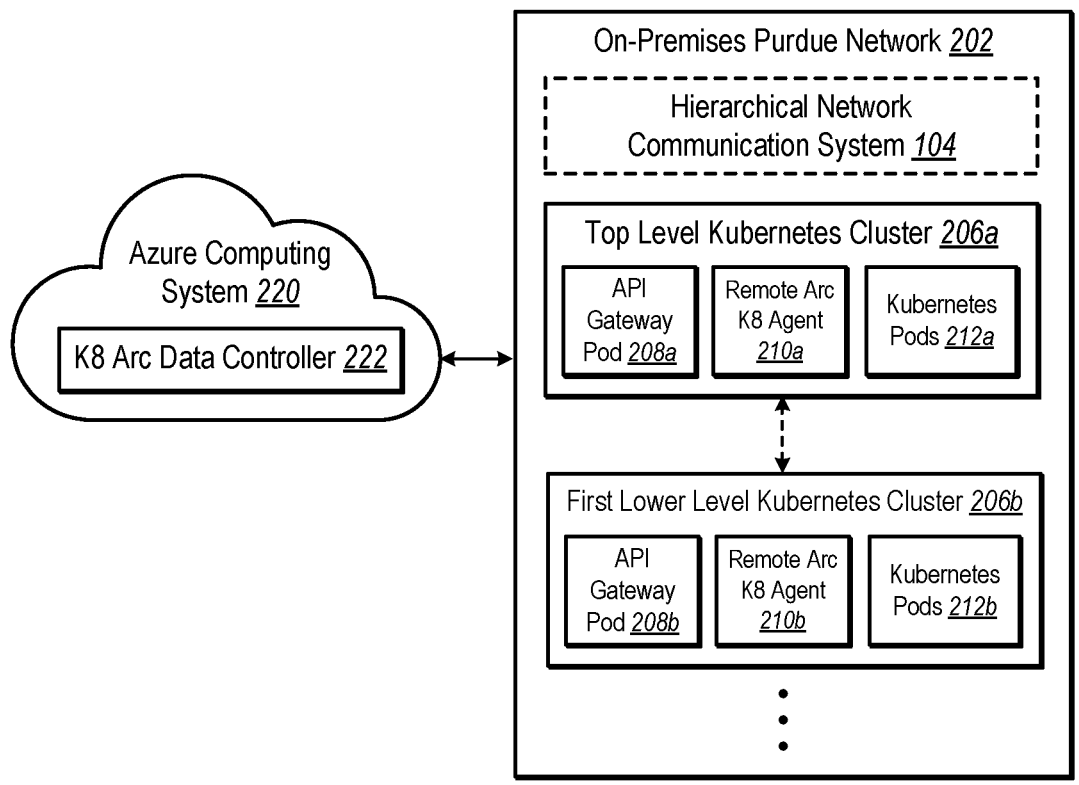
FIG. 2 illustrates an example diagram of a controlled hierarchical network that includes Kubernetes clusters at each network level in accordance with one or more implementations.

Turning to FIG. 2, this figure illustrates an example diagram of a hierarchical network that includes Kubernetes clusters at each level in accordance with one or more implementations. As shown, FIG. 2 includes an on-premises Purdue network 202 and an Azure computing system 220. For example, the on-premises Purdue network 202 represents an example of the hierarchical network 102 described above, and the Azure computing system 220 represents an example of the cloud computing system 120 described above. As shown, the Azure computing system 220 includes a K8 Architecture data controller 222 (where "K8" is shorthand for "Kubernetes"). In various implementations, the on-premises Purdue network 202 is an example of a controlled hierarchical network located on the site of a manufacturing entity.

As also shown, the on-premises Purdue network 202 includes the hierarchical network communication system 104 and two network levels, each having an API gateway pod, a remote Arc Kubernetes agent, and Kubernetes pods. For example, the on-premises Purdue network 202 includes a top-level Kubernetes cluster 206a having an API gateway pod 208a, a remote Arc K8 agent 210a, and Kubernetes pods 212a; a first lower-level Kubernetes cluster 206b having a second API gateway pod 208b, a second remote Arc K8 agent 210b, and Kubernetes pods 212b; and additional lower network levels having similar Kubernetes clusters (which are not shown for simplicity).

In one or more implementations, the on-premises Purdue network 202 is onboarded to the Azure computing system 220 by having each network level added to the Azure computing system 220. In particular, remote Arc K8 agents allow the architecture data controller 222 on the Azure computing system 220 to map a representation of a network level/Kubernetes cluster, such that it appears that on-premises Purdue network 202 is part of the Azure computing system 220. For example, the top level Kubernetes cluster 206a, which has line-of-sight access to the Azure computing system 220 first onboards the top level Kubernetes cluster 206a by first installing the remote Arc K8 agent 210a.

As part of onboarding, to enable communication between the Azure computing system 220 and the lower network levels of the on-premises Purdue network 202, the hierarchical network communication system 104 also adds API gateway pods to each network level/Kubernetes cluster to allow for secure inter-network level communications as well as secure communications with the Azure computing system 220. For example, the hierarchical network communication system 104 adds the API gateway pod 208a on the top level Kubernetes cluster 206a to allow the first lower level Kubernetes cluster 206b to communicate with the Azure computing system 220 such that the second API gateway pod 208b can be onboarded as well as send communications to the architecture data controller 222 on the azure computing system 220.

Indeed, the hierarchical network communication system 104 utilizes API gateway pods to enable the Azure computing system 220 to efficiently observe and inspect resources on lower network levels (e.g., the Kubernetes pods 212b, which may include cluster provisioning, monitoring, upgrade and patch management, and lifecycle management) as well as perform updates, upgrades, and deployments on these lower network levels. Additionally, the hierarchical network communication system 104 provides these improvements while supporting and enforcing Purdue Model security standards.

Moreover, in various implementations, the hierarchical network communication system 104 provides the necessary architecture to support Purdue model networks to manage them through cloud systems without compromising any of the ISA-95/Purdue network security principles, which include network isolation, terminating and restarting connections (e.g., no tunneling), low connection and bandwidth requirements, auditing (e.g., inspecting data being received and sent at each network level), and data control (e.g., what data is moving between network levels). Indeed, the hierarchical network communication system 104 solves multiple problems of existing computer systems for which no previous solutions existed.

While FIG. 2 provided a specific example of how the hierarchical network communication system 104 allows an on-premises Purdue network 202 with Kubernetes to efficiently, accurately, and flexibly interact with an Azure computing system 220, FIGS. 3A-7 provide details regarding how the hierarchical network communication system 104 operates at a more granular level. Additionally, while FIGS. 3A-7 describe a general version of the hierarchical network 102, the same principles and approaches apply to the on-premises Purdue network 202 and other Purdue model networks.

Figure 3A:
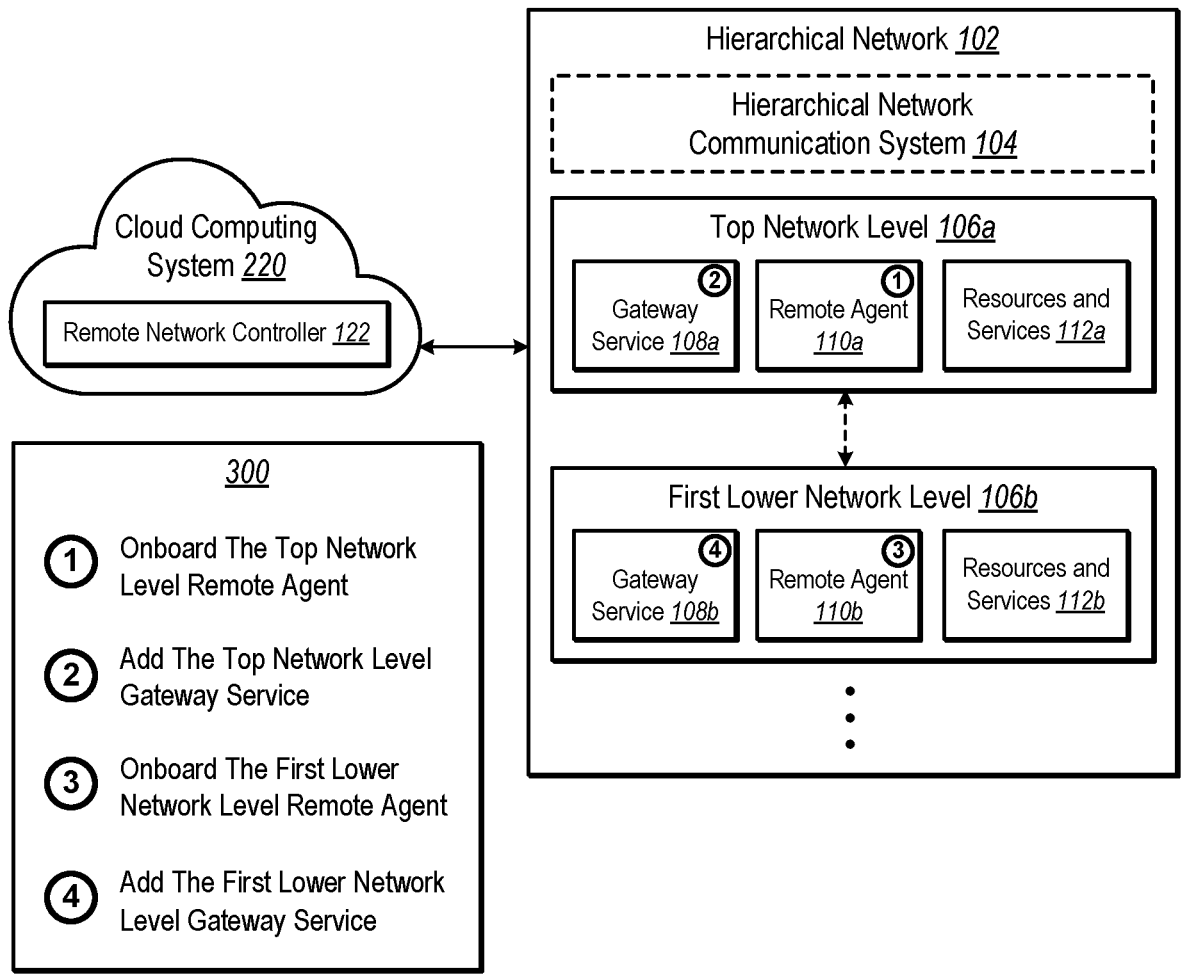
FIG. 3A-3B illustrate example diagrams of onboarding a controlled hierarchical network to a cloud computing system in accordance with one or more implementations.
Figure 3B:
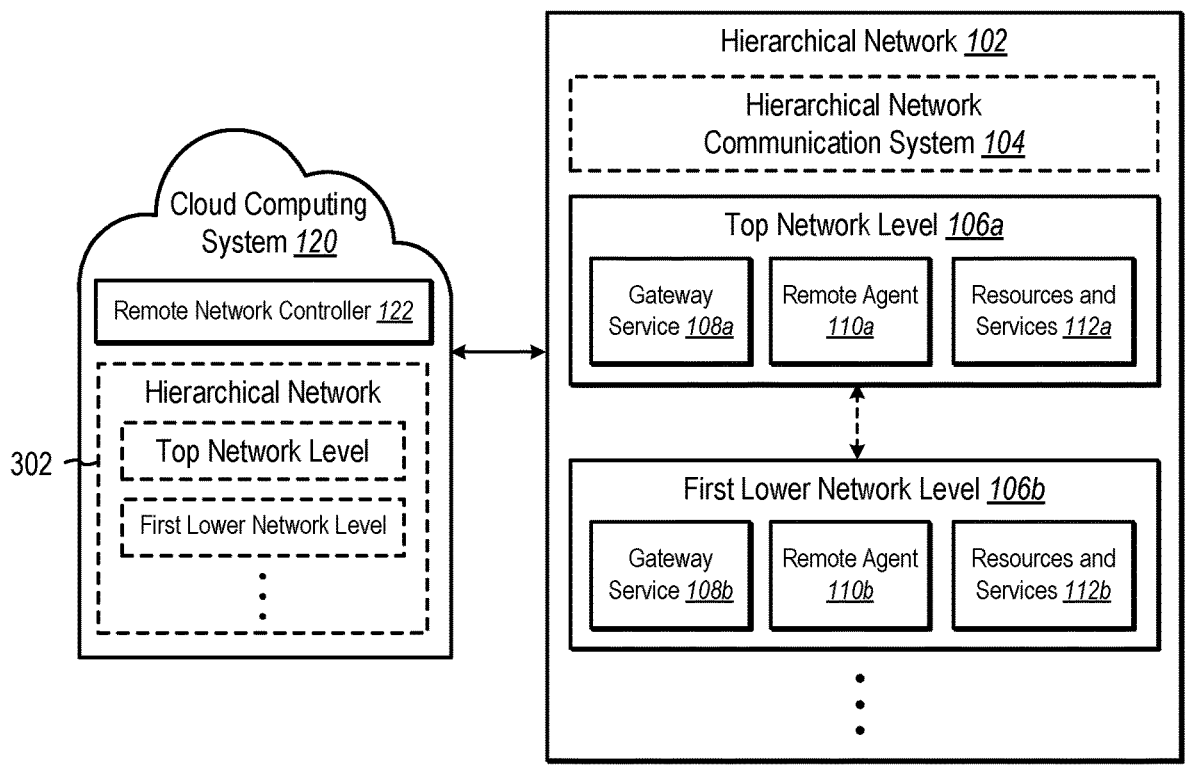

Turning now to FIG. 3A-3B, these figures illustrate example diagrams of onboarding a hierarchical network having the hierarchical network communication system to a cloud computing system in accordance with one or more implementations. In particular, FIG. 3A details steps for onboarding a hierarchical network 102 to a cloud computing system 120. FIG. 3B shows the hierarchical network 102 onboarded to the cloud computing system 120.

FIG. 3A, as shown, includes the hierarchical network 102 and the cloud computing system 120, which are introduced above. For example, the hierarchical network 102 includes the hierarchical network communication system 104 as well as the top network level 106a and the first lower network level 106b. While not shown for simplicity, the hierarchical network 102 often includes additional lower network levels. Additionally, each of the network levels shown includes a gateway service, remote agent, as well as resources and services, which have been introduced above.

As shown, FIG. 3A includes a series of acts 300 for onboarding the hierarchical network 102 to the cloud computing system 120. As mentioned above, in various instances, the hierarchical network 102 may be operated, controlled, and/or managed by an entity other than the entity that controls the cloud computing system 120. Accordingly, onboarding the hierarchical network 102 to the cloud computing system 120 allows the hierarchical network 102 to appear and function as if it were part of the cloud computing system 120. In this manner, multiple hierarchical networks operated by multiple entities can be brought under the function and control of the cloud computing system 120.

To illustrate, the series of acts 300 includes Act 1 (i.e., a circled "1") of adding the top network level 106a to the cloud computing system 120 by onboarding the top network level remote agent (e.g., the first remote agent 110a). In various implementations, the top network level remote agent is initiated on the hierarchical network side and allows for communications between the top network level 106a, which has limited line-of-sight access to the cloud computing system 120. In particular, in many instances, the top network level remote agent communicates with the remote network controller 122 on the cloud computing system 120 to map the top network level 106a, along with its resources and services 112a to the cloud computing system 120.

As shown, the acts 300 includes Act 2 of adding the top network level gateway service (i.e., first gateway service 108a) to the top network level 106a. In order for lower network levels to be effectively onboarded to the cloud computing system 120, a communication channel between each set of adjacent levels needs to be open, as the lower network level does not have a line-of-sight communication path with the cloud computing system 120. Accordingly, the hierarchical network communication system 104 adds the top network level gateway service to the top network level 106a to provide a communication bridge between the cloud computing system 120 and the first lower network level 106b.

As shown, the acts 300 includes Act 3 of onboarding the first lower network level remote agent (e.g., the second remote agent 110b), which maps the first lower network level 106b to the cloud computing system 120. In this manner, the cloud computing system 120 has access to manage, control, and modify the resources and services 112b on the first lower network level 106b.

Additionally, in various implementations, while onboarding network levels, the hierarchical network communication system 104 preserves the relationships between network levels. For example, as part of onboarding network levels, the parent-child relationships are preserved between network levels (or Kubernetes clusters). As a result, these same relationships are shown within the cloud computing system 120. Further, by maintaining parent-child relationships inside of objects in a hierarchical network, the hierarchical network communication system 104 is able to utilize these relationships to efficiently forward requests.

As provided above, the cloud computing system 120 communicates with the first lower network level remote agent via communications passed through the top network level gateway service on the top network level 106a. Indeed, the top network level gateway service provides a first secure connection between the first lower network level 106b and the top network level 106a and a second secure connection between the top network level gateway service and the cloud computing system 120.

As shown, the acts 300 includes Act 4 of adding the first lower network level gateway service (i.e., second gateway service 108b) to the first lower network level 106b. As with the top network level gateway service, the first lower network level gateway service serves as an intermediary point between levels for facilitating secure connections. Accordingly, the first lower network level gateway service allows for lower network levels to also be onboarded to the cloud computing system 120 by repeating the above acts.

In some implementations, the hierarchical network communication system 104 adds a gateway service and remote agent to each network level of the hierarchical network 102. In alternative implementations, the hierarchical network communication system 104 adds a remote agent to each network level but does not add a gateway service to the lowest or bottom network level. For instance, because the gateway service is a bridge between a network level and a lower network level, in various implementations, the bottom network level does not need a gateway service (but it still needs a remote agent that communicates with the remote network controller 122 of the cloud computing system 120).

Moving to FIG. 3B, this figure shows the cloud computing system 120 having a mapping 302 of the hierarchical network 102, which is shown as the hierarchical network in dashed lines on the cloud computing system 120. As shown, the network levels and their relationships are preserved as part of the mapping 302. While not shown, the mapping 302 can also include what resources and services are available at the mapped network level and/or information about each (e.g., data being processed, operating status, update status, etc.). By having the mapping 302 of the hierarchical network 102, the hierarchical network communication system 104 allows the cloud computing system 120 to monitor, inspect, audit, and manage services and resources across different network levels of the hierarchical network 102.

Figure 4:
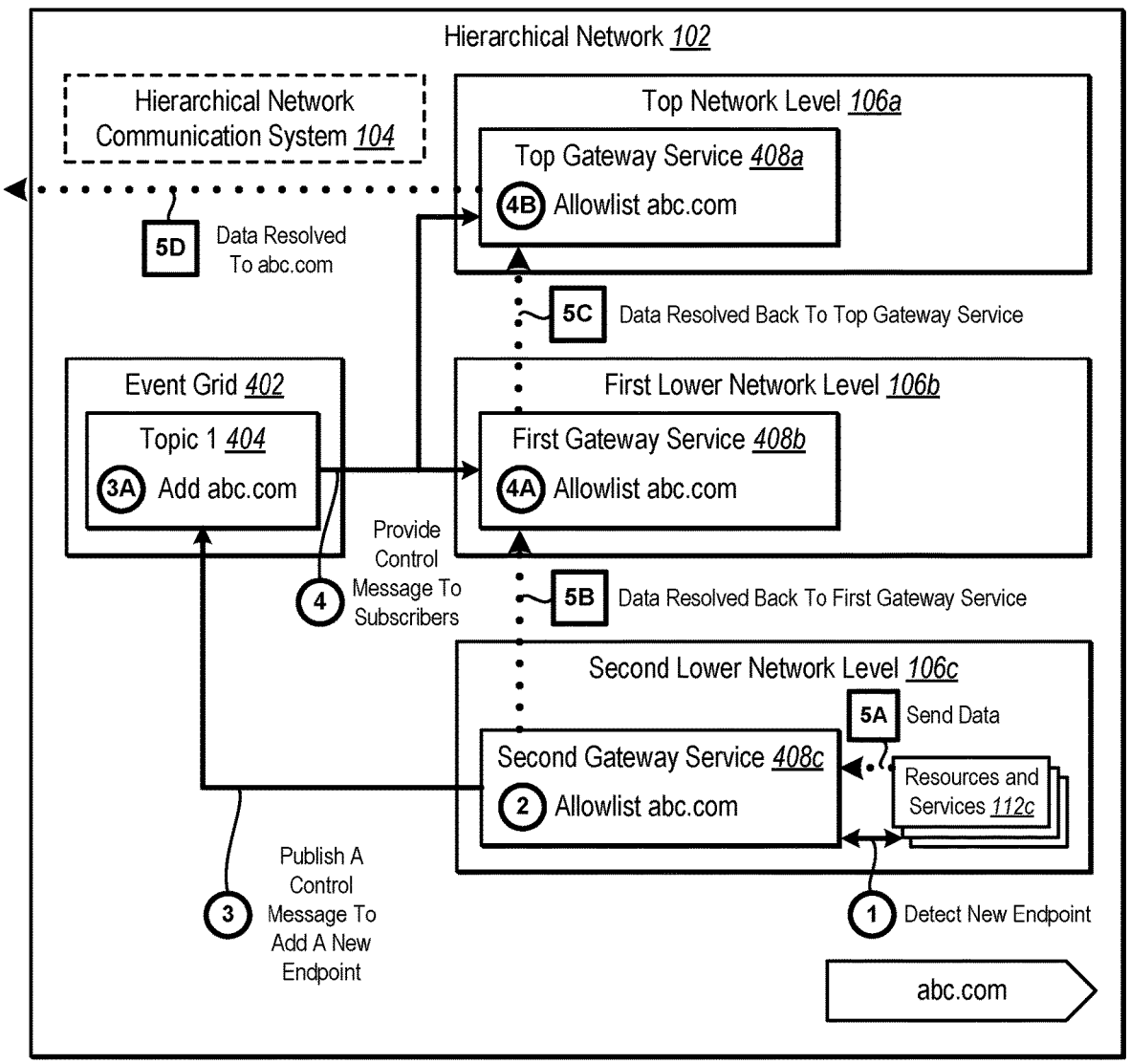
FIG. 4 illustrates an example diagram of internally managing a controlled hierarchical network via the controlled hierarchical network communication system in accordance with one or more implementations.

FIG. 4 illustrates an example diagram of internally managing a hierarchical network via the hierarchical network communication system 104 in accordance with one or more implementations. In particular, FIG. 4 shows the hierarchical network communication system 104 facilitating a service on a lower network level and securely sending data or a request to (or accessing data from) an external computing device. Additionally, FIG. 4 shows the hierarchical network communication system 104 utilizing control messages to automatically update endpoints at each network level to facilitate the service on a lower network level.

As shown, FIG. 4 includes the hierarchical network 102 having the hierarchical network communication system 104 and the top network level 106a, the first lower network level 106b, and a second lower network level 106c. As also shown, each network level includes a gateway service. For example, the top network level 106a includes a top gateway service 408a, the first lower network level 106b includes a first gateway service 408b, and the second lower network level 106c includes a second gateway service 408c. Additionally, the second lower network level 106c shows resources and services 112c. Further, the hierarchical network 102 includes an event grid 402.

FIG. 4 includes a series of acts. As shown, the series of acts includes Act 1 (i.e., a circled "1") of a service from the resources and services 112c on the second lower network level 106c requesting to send data or a data request to an external computing device (e.g., an external destination). For example, the service includes a sensor or edge device that collects data in a manufacturing environment and generates a service request to send collected data to an external computing device (not shown in FIG. 4). In another instance, the service is requesting or accessing data needed to perform additional data processing. For instance, the external computing device is part of a corresponding cloud computing system. Accordingly, as illustrated in Act 1, a service is requesting an endpoint with a URL or host name of abc.com.

As shown, the series of acts includes Act 2 of the second gateway service 408c detecting the request from the resources and services 112c. For example, the second gateway service 408c monitors the activity of services on the second lower network level 106c to detect service requests that request sending data to external computing devices or to other network levels (as these services are prohibited from sending data outside of their own network level). In some implementations, the service sends a message that the second gateway service 408c receives including the service request to send out data or a data request.

As part of this second act A2, the second gateway service 408c identifies an endpoint associated with the service request. For example, the second gateway service 408c identifies that the service is requesting to send data to an endpoint that is dynamically assigned to the external computing device. Accordingly, in various implementations, the second gateway service 408c adds the endpoint (e.g., abc.com) to a local allowlist, as shown. For instance, the second gateway service 408c adds the endpoint to an access management list that is part of its resource control plane.

Additionally, as part of the Act 2, the second gateway service 408c determines that the endpoint is outside of the hierarchical network 102 and, thus, needs to travel through each upper network level of the hierarchical network 102. In these implementations, the hierarchical network communication system 104 utilizes the second gateway service 408c to generate a control message to send to the gateway services on the upper network levels.

As shown, the second gateway service 408c adds the endpoint to a publication list (e.g., via a messaging manager), which publishes the control message to the event grid 402 and indicates the new endpoint for the requesting service. In some instances, the second gateway service 408c publishes the control message to a first topic 404 (i.e., "Topic 1") within the event grid 402, which is shown by Act 3A in the series of acts and where Topic 1 includes a control message to add the endpoint of abc.com.

As shown, the series of acts includes Act 4 of the providing the control message to subscribers. For example, the first gateway service 408b and the top gateway service 408a subscribe to the first topic 404 (i.e., "Topic 1"). Accordingly, when the first topic 404 receives a new control message for Topic 1, it provides the control message to subscribers. Since the first gateway service 408b subscribes to the first topic 404 (e.g., Topic 1 is on a subscription list within its messaging manager), a first gateway service 408b receives the control message to authorize the endpoint of abc.com. The same applies to the top gateway service 408a, which locally repeats the actions described above.

As shown, the series of acts includes Act 4A of the first gateway service 408b adding the endpoint of abc.com to the allowlist of its local access management list. Similarly, the series of acts includes Act 4B of the second gateway service 408c adding the endpoint of abc.com to its allowlist. In many implementations, the hierarchical network communication system 104 automates Act 4A and Act 4B by dynamically updating the respective access management lists to allow the endpoint to pass through securely without requiring a user to manually code the endpoint at each level.

As shown, the series of acts includes additional acts of sending data from the service to the external computing device. In particular, the series of acts includes Act 5A (i.e., a boxed "5A") of the service sending data to the second gateway service 408c. The second gateway service 408c receives the data and determines from the endpoint that 1) the endpoint is on its local allowlist and 2) that the endpoint corresponds to an external computing device. Accordingly, the second gateway service 408c determines to send the data to the gateway service in the next network level above, which is the first gateway service 408b.

As shown in Act 5B, the second gateway service 408c sends the data to the first gateway service 408b. In various implementations, the second gateway service 408c resolves the endpoint from the endpoint of the external computing device to the endpoint of the first gateway service 408b. For example, the second gateway service 408c resolves the endpoint from the host name of "abc.com" to an endpoint of the first gateway service 408b of "abc.com first_lower_level.gateway_service.com." Additional details regarding resolving and sending data between network levels are provided in connection with FIG. 6 below.

Since the first gateway service 408b also includes the endpoint (e.g., abc.com) as approved on its access management list, the first gateway service 408b passes the data to the next network level up, which is the top gateway service 408a. Accordingly, the series of acts shows Act 5C of the first gateway service 408b resolving the data back to the top gateway service 408a. For example, the first gateway service 408b resolves the endpoint to "abc.com top_level.gateway_service.com."

As shown, the series of acts includes Act 5D of the top gateway service 408a sending the data to the external computing device. In particular, the top gateway service 408a resolves (e.g., replaces) the ingress endpoint to the host name of abc.com and sends the data or data request to the external computing device with the target endpoint. As with the previous acts, the top gateway service 408a may first verify that 1) the endpoint is on its local allowlist and 2) that the endpoint is directed to an external computing device. Further, in the case of a data request, the hierarchical network communication system 104 may use the same or different secure channels between the gateway services on the different network levels to provide received data back to the requesting service.

In various implementations, the hierarchical network communication system 104 automatically detects and adds endpoints for additional services. For example, if the first gateway service 408b on the first lower network level 106b detects a service requesting endpoint access, the first gateway service 408b adds the endpoint to its allowlist and provides a control message to the top gateway service 408a to add the endpoint. In this example, the second gateway service 408c on the second lower network level 106c does not add the endpoint to its allowlist as it is below the network level 106 in the hierarchical network 102. For instance, in some instances, the control message includes a control field indicating which network levels should add the endpoint to their allowlist.

As mentioned above, services can have dynamically assigned endpoints. It is also common for endpoints assigned to a service to change. In these implementations, the hierarchical network communication system 104 detects the endpoint modification and is able to quickly and efficiently update the endpoint across the relevant gateway services. Likewise, if an endpoint is deemed to no longer be of use, expires, becomes less secure, etc., the hierarchical network communication system 104 quickly and automatically removes the endpoint for all gateway services and/or adds the endpoint to a blocklist. In this manner, the hierarchical network communication system 104 provides real-time security and functionality by selectively enabling and disabling endpoints.

Figure 5:
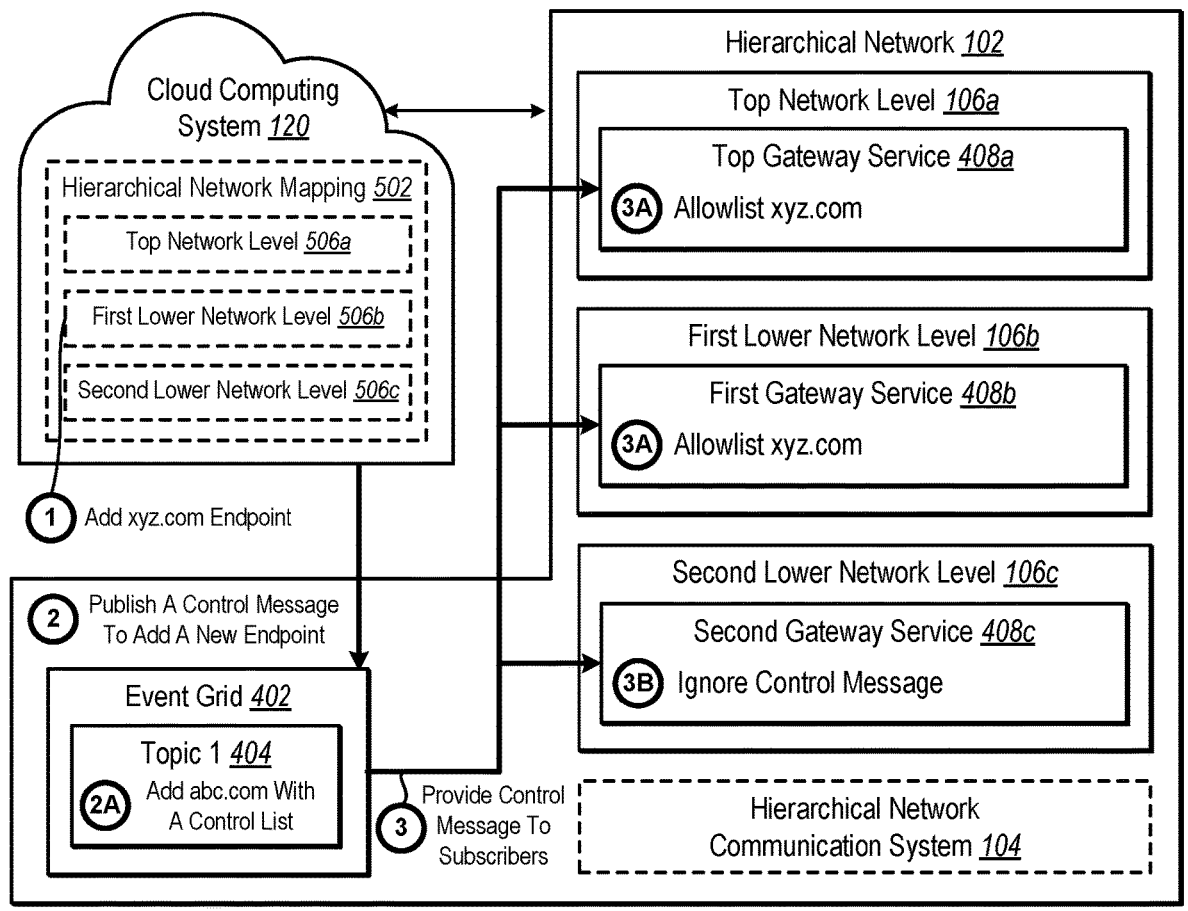
FIG. 5 illustrates an example diagram of externally managing a controlled hierarchical network via the controlled hierarchical network communication system in accordance with one or more implementations.

FIG. 5 illustrates an example diagram of externally managing a hierarchical network via the hierarchical network communication system in accordance with one or more implementations. To elaborate, while FIG. 4 shows how the hierarchical network communication system 104 manages a hierarchical network 102 based on an internal process (e.g., a service sending data or data requests to an external computing device), FIG. 5 shows how the hierarchical network communication system 104 manages the hierarchical network 102 based on an external process. In particular, FIG. 5 shows how the hierarchical network communication system 104 manages the hierarchical network 102 in connection with a cloud computing system 120.

As shown, FIG. 5 includes the hierarchical network 102 having similar components as shown in FIG. 4. Additionally, FIG. 5 also includes the event grid 402 having the first topic 404 shown in FIG. 4. Further, FIG. 5 includes the cloud computing system 120 having the hierarchical network mapping 502, as described above. In particular, the hierarchical network mapping 502 includes mapping labels for the mappings of the top network level 506a, first lower network level 506b, and second lower network level 506c within the cloud computing system 120.

As shown, FIG. 5 includes a series of acts including Act 1 (i.e., a circled "1") of the cloud computing system 120 adding an endpoint to the mapping of the first lower network level 506b. For example, a user or automated process utilizing the cloud computing system 120 determines that a service of the hierarchical network 102 on the first lower network level 106b needs to access and/or provide data to a computing device (e.g., an external computing device) having the endpoint with a URL of abc.com. Accordingly, in various instances, the cloud computing system 120 adds the endpoint to a mapped version of the first gateway service 408b on the first lower network level 506b on the hierarchical network mapping 502 on the cloud computing system 120.

As shown, the series of acts includes Act 2 of the cloud computing system 120 publishing a control message to the event grid 402 on the hierarchical network 102 to add a new endpoint. For example, the hierarchical network 102 includes a messaging service that allows it to publish and subscribe to messages (e.g., control messages) of the hierarchical network 102. Accordingly, as shown in Act 2A, the event grid 402 includes a control message to add the endpoint of abc.com to gateway services.

In addition, Act 2A shows a control list within the control message. For instance, in various implementations, the control message includes a control list that specifies the gateway services of which network level should add the endpoint. In some implementations, the control list includes a flagged entry for each network level. For example, in the current example, the control message includes positive flags for the top gateway service 408a and the first gateway service 408b but no flag or a negative flag for the second gateway service 408c (e.g., the top network level 106a and the first lower network level 106b but not the second lower network level 106c). The control list may otherwise indicate when an endpoint is to be added to which network levels.

As shown, the series of acts includes Act 3 of the event grid 402 providing the control message to subscribers. In various implementations, the hierarchical network communication system 104 utilizes a message queue or another type of messaging service in place of, or in addition to, the event grid 402. As illustrated, each of the gateway services in the hierarchical network 102 subscribe to the first topic 404, where the control message is published. Accordingly, each gateway service receives the control message. In some implementations, the event grid 402 filters the control message from being provided to the second gateway service 408c based on it not applying to the second lower network level 106c (e.g., based on the control list).

As shown, the services of acts include Act 3A of the top gateway service 408a and the first gateway service 408b adding the endpoint of abc.com to their respective allowlists. Additionally, the services of acts includes Act 3B of the second gateway service 408c ignoring, disregarding, or not executing the control message because it is not applicable. In some instances, the second gateway service 408c still adds the endpoint to its allowed list. Once added to the relevant access management lists, the corresponding service on the first lower network level 106b can send data or data requests to (or receive data from) an external computing device associated with the endpoint, as described above, in connection with FIG. 4.

Just as the hierarchical network communication system 104 enables the cloud computing system 120 to add endpoints to the gateway service of the hierarchical network 102, in additional implementations, the hierarchical network communication system 104 facilitates other remote control actions. For example, the hierarchical network communication system 104 allows the cloud computing system 120 to use endpoints to observe and inspect data on a given network level or passing through the hierarchical network 102, modify configurations and settings of the hierarchical network 102, and provide service updates and upgrades, as well as deploy new services and resources.

Figure 6:
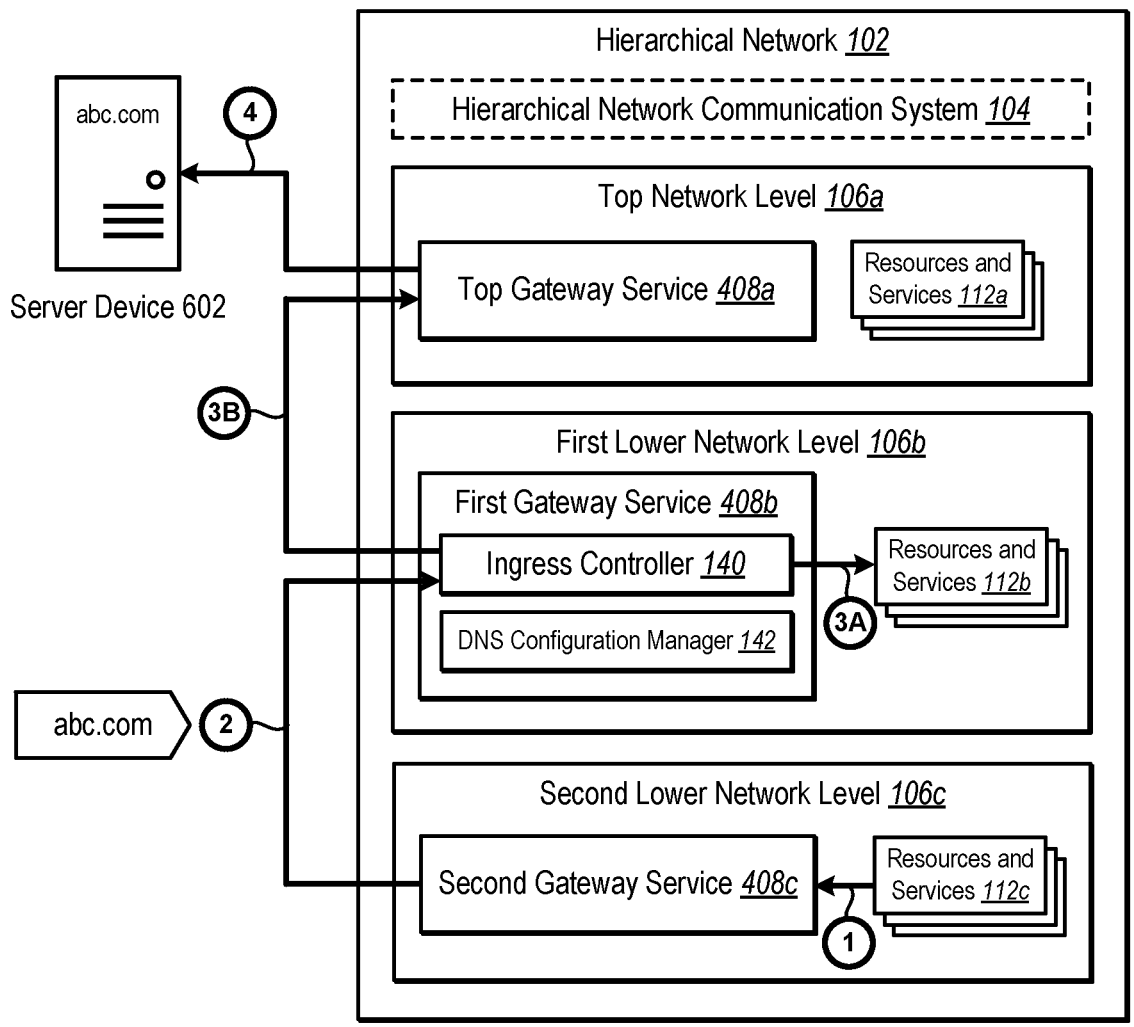
FIG. 6 illustrates an example diagram of utilizing gateway services to route data between network levels of a controlled hierarchical network in accordance with one or more implementations.

FIG. 6 illustrates an example diagram of utilizing gateway services to route data between network levels of a hierarchical network in accordance with one or more implementations. As mentioned above, FIG. 6 provides additional details regarding sending data between gateway services on adjacent (e.g., neighboring) network levels.

As shown, FIG. 6 includes the hierarchical network 102 and corresponding components described above, such as the top network level 106a having the top gateway service 408a and resources and services 112a, the first lower network level 106b, and the second lower network level 106c. In addition, FIG. 6 includes a server device 602. In various implementations, the server device 602 is an external computing device and/or part of the cloud computing system described above.

As shown, FIG. 6 includes a series of acts including Act 1 (i.e., a circled "1") of receiving a request from a service (e.g., a service pod) on the second lower network level 106c to provide data to the server device 602, which has a corresponding endpoint. In response, the second gateway service 408c detects the service request, adds the endpoint to an access management list, and provides a control message for the gateway services on the higher network levels to also add the endpoint, as described above in connection with FIG. 4.

Additionally, the series of acts includes Act 2 of the second gateway service 408c sending the data to the first gateway service 408b. As mentioned above, in various instances, the second gateway service 408c resolves the data from the endpoint of the server device 602 to an endpoint of the first gateway service 408b. For example, the second gateway service 408c resolves the endpoint for the data transmission from "abc.com" to an ingress endpoint of the first gateway service 408b of "abc.com first_lower_level-.gateway_service.com."

Upon receiving the data, the first gateway service 408b can utilize an ingress controller 140 to initially process the data. As described above, in various implementations, the ingress controller 140 controls the forwarding of incoming traffic. In some implementations, the ingress controller 140 is a proxy based on NGINX (e.g., a server service that provides proxy functionality).

As also described above, in a few implementations, the ingress controller 140 forwards data or a data request received at a network level (e.g., a Kubernetes cluster on a network layer) to internal resources and services for deployment, such as shown in the Act 3A. Instead, in various implementations, the hierarchical network communication system 104 utilizes the ingress controller 140 to route the request or data to an external domain or host name, or to another network level. For instance, Act 3B shows the ingress controller 140 forwarding the data to the top gateway service 408a, which utilizes the same principles to forward the data to the server device 602 having the endpoint of abc.com, which is shown as Act 4.

To elaborate, in various implementations, the hierarchical network communication system 104 utilizes an external name service, such as ExternalName Service in Kubernetes. In various implementations, the external name service does not employ selectors but utilizes DNS names (e.g., host names) instead. For instance, the external name service maps a service to a DNS name rather than to a typical selector (e.g., my-service in Kubernetes).

In certain implementations, the DNS configuration manager 142 in the first gateway service 408b provides the functions of the external name service. For example, the external name service routes traffic to an external domain (e.g., the host name abc.com) based on the endpoint name. In various implementations, the hierarchical network communication system 104 performs redirections at the DNS level (e.g., the DNS configuration manager 142) rather than via proxying or forwarding. For instance, based on an external name type service or feature, the DNS configuration manager 142 determines that the endpoint is an external destination and, as such, determines to forward the received data to the next network level up, where the DNS configuration manager on the next gateway service will operate similarly until it arrives at the top network level. At the top network level, a DNS configuration manager will resolve or replace its ingress endpoint with the host name of the external computing device.

In various implementations, when providing a data request and/or data to another gateway service on another network level, the gateway service functions as a reverse proxy. Indeed, unlike an unsecured forward proxy from a lower network level to an external computing device, the hierarchical network communication system 104 utilizes reverse proxy functions to securely send communications between network levels of the hierarchical network 102.

Figure 7:
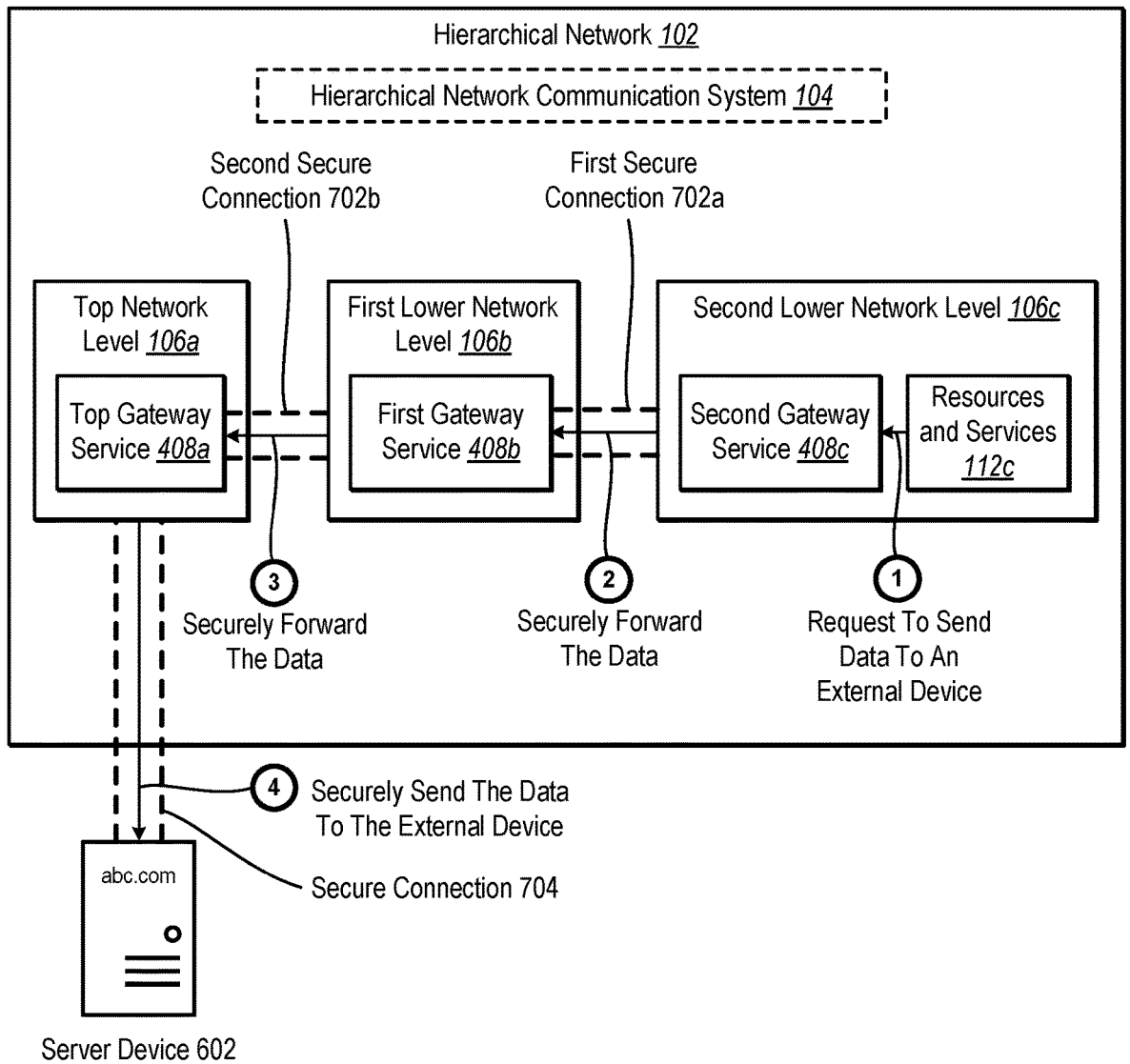
FIG. 7 illustrates an example diagram of securely routing data between network levels of a controlled hierarchical network in accordance with one or more implementations.

FIG. 7 illustrates an example diagram of securely routing data between network levels of a hierarchical network in accordance with one or more implementations. In particular, FIG. 7 provides detail regarding secure connections between network levels using robust architecture and effective security measures. For example, the hierarchical network communication system 104 utilizes separate secure connections for each communication link that often use multiple security measures, as described below.

As shown, FIG. 7 includes the hierarchical network 102 having the hierarchical network communication system 104 and network levels having various corresponding components, as introduced above. FIG. 7 also includes the server device 602. Additionally, the hierarchical network 102 includes secure connections between the network levels as well as with the server device 602, which are each described below in additional detail.

Additionally, FIG. 7 includes a series of acts for sending data or data requests from a service on the second lower network level 106c to the server device 602. As a note, while FIG. 4 previously described a series of acts for sending out data or data requests, the series of acts in FIG. 7 focuses on security measures of the hierarchical network communication system 104 to ensure that Purdue Model security standards are strictly upheld.

To illustrate, the series of acts in FIG. 7 includes Act 1 (i.e., a circled "1") of a service requesting to send data to an external device (e.g., the server device 602). In various implementations, because the request is within a network level and the network level is isolated from other parts and levels of the hierarchical network 102, little or no security is needed. In alternative implementations, the service (e.g., the compute service) hides the request with one or more security processes.

As described above, the second gateway service 408c receives the service request, adds a detected end point to its allowlist and/or access management list, and provides control messages to the higher gateway services to act similarly. In connection with the hierarchical network communication system 104 automatically authorizes the endpoint associated with the service request across the hierarchical network 102, the second gateway service 408c can begin to send the data or data request up the network levels.

In various implementations, the second gateway service 408c forms (or uses the existing) first secure connection 702a between the second gateway service 408c and the first gateway service 408b. For instance, the first secure connection 702a includes a TLS termination point at the two gateway services. In some implementations, such as when communicating between Kubernetes, the hierarchical network communication system 104 may need to make configuration changes, such as setting an annotation on an ingress object to true. Additionally, as part of forming the first secure connection 702a, the hierarchical network communication system 104 may also need to designate a specific port, such as 443 or another suitable port number. In example implementations, the hierarchical network communication system 104 needs to change a configuration setting or feature that allows for SSL passthrough.

Similarly, for Act 3 of the series of acts, the hierarchical network communication system 104 utilizes a second secure connection 702b, which is separate from the first secure connection 702a. Again, the hierarchical network communication system 104 creates TLS termination points between the first gateway service 408b of the first lower network level 106b and the top gateway service 408a of the top network level 106a. In this manner, even within the hierarchical network 102, sensitive information is protected as it travels across different secure connections between network levels. Additionally, because each secure connection terminates at a gateway service, the data can be inspected at each stop within the hierarchical network 102.

Within the first secure connection 702a and the second secure connection 702b, the hierarchical network communication system 104 is able to perform a variety of features and functions. For example, the hierarchical network communication system 104 utilizes one or more of the following features: Layer 7 HTTPS/HTTP, reverse proxying, forward proxying with SSL tunneling, OAuth 2.0, request headers & params editing, select ciphers, and WebSockets.

In various implementations, in setting up a secure connection, the hierarchical network communication system 104 generates and/or utilizes security certificates. To illustrate, in one or more implementations, the hierarchical network communication system 104 obtains a private key and a server certificate containing the public key. In some cases, the server certificate is self-signed. In other cases, the server certificate is a commercial certificate signed by a trusted certificate provider. In either case, the hierarchical network communication system 104 ensures that the common name of the server certificate matches the URL of an endpoint requested by a service; otherwise, the service will not be trusted by connected clients. In some instances, when a service is reachable through multiple URLs (e.g., multiple endpoints or a range of endpoints), then the hierarchical network communication system 104 can obtain a multi-domain signed server certificate to cover multiple URLs. In various implementations, the signed certificate has SANs (Subject Alternative Names) or is defined with a wildcard entry.

In many implementations, to ensure strict security measures, the hierarchical network communication system 104 requires a certificate for each network level (e.g., for network layers having Kubernetes clusters). For instance, the ingress controller needs to have a valid signed certificate before the gateway service on a lower network level will accept data passed down to it. In certain implementations, an ingress controller supports multiple server certificates, which might be necessary in case a created SAN certificate is insufficient to support new extensions or services.

Returning to FIG. 7, the series of acts includes Act 4 of sending the data from the top network level 106*a* to the server device 602 via a secure connection 704. For example, the top gateway service 408*a* utilizes one or more security processes, such as SSL, TLS, encryption, etc., to securely send data or data requests from the hierarchical network 102 to the server device 602 as well as receive data back from the server device 602. In alternative implementations, the secure connection 704 is bolstered by security certificates that capitalize on sophisticated encryption techniques.

Figure 8:
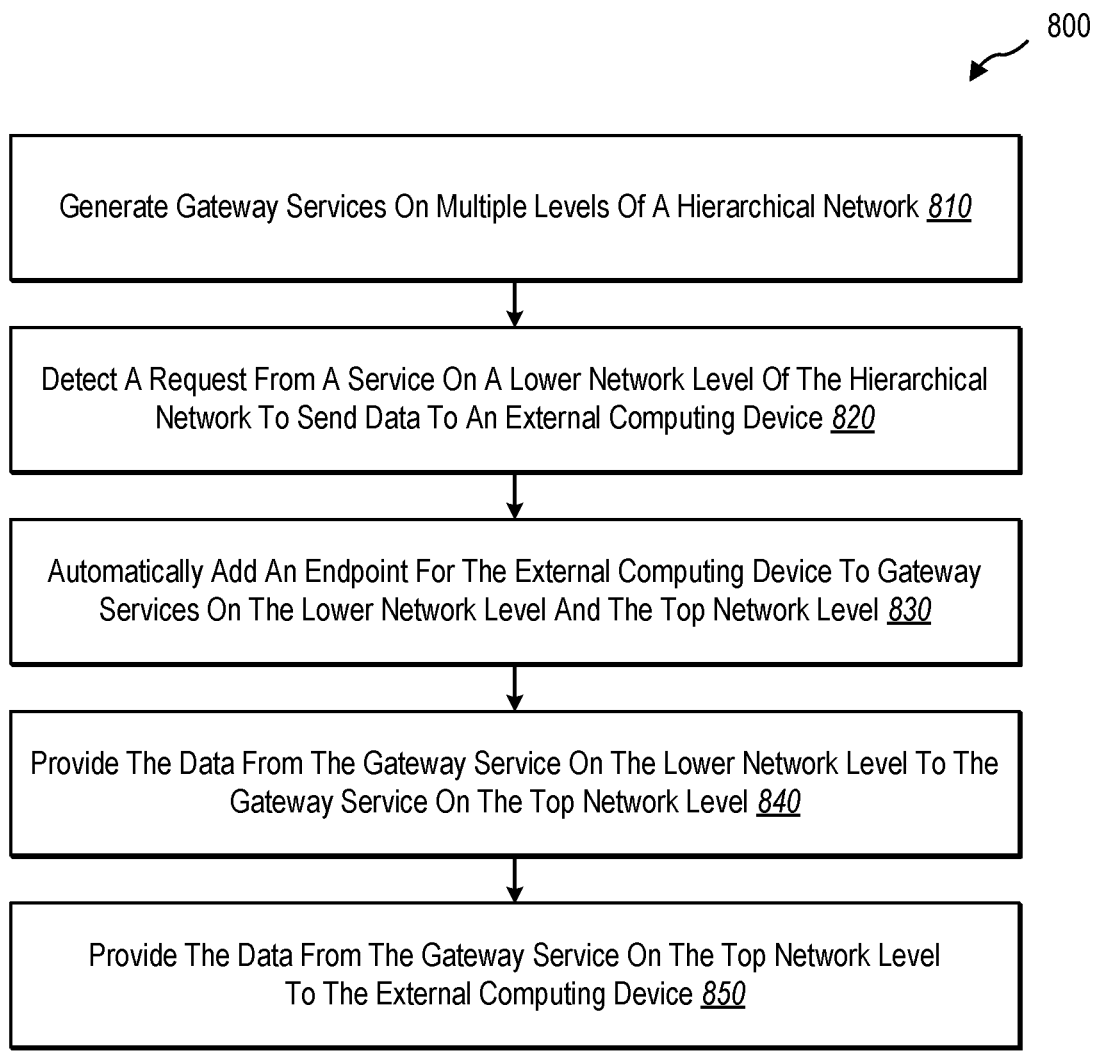
FIG. 8 illustrates an example series of acts for efficiently and securely sending data from a lower network level of a controlled hierarchical network to an external computing device in accordance with one or more implementations.

Turning now to FIG. 8, this figure illustrates an example flowchart that includes a series of acts 800 for utilizing the hierarchical network communication system 104 in accordance with one or more implementations and/or methods. In particular, FIG. 8 illustrates an example series of acts 800 for efficiently and securely sending data from a lower network level of a hierarchical network to an external computing device (e.g., an external destination) in accordance with one or more implementations. Furthermore, the acts of FIG. 8 can be performed as part of a method. Alternatively, a non-transitory computer-readable medium can include instructions that, when executed by one or more processors, cause a computing device to perform the acts 800 of FIG. 8. In still further implementations, a system can perform the acts 800 of FIG. 8.

As shown, the series of acts 800 includes an act 810 of generating gateway services on multiple levels of a hierarchical network. For instance, in example implementations, the act 810 involves generating gateway services at multiple levels of a hierarchical network that includes at least a top network level and a lower network level that are isolated from each other, where only the top network level communicates with computer devices outside of the hierarchical network. In various implementations, the lower network level includes a first Kubernetes cluster that includes the first gateway service as a first application programming interface (API) gateway pod, the top network level includes a second Kubernetes cluster that includes the second gateway service as a second API gateway pod, and/or the first Kubernetes cluster performs different functions than the second Kubernetes cluster. In some implementations, the lower network level includes a first Kubernetes cluster and the top network level includes a second Kubernetes cluster that performs different functions than the first Kubernetes cluster.

In some implementations, the act 810 includes adding the first gateway service on the top network level and the second gateway service on the lower network level, where the first gateway service communicates with the second gateway service via secure communications. In many implementations, the hierarchical network conforms to a Purdue Reference Architecture Model In additional implementations, the first gateway service includes an ingress controller for forwarding incoming data between API gateway pods on different network levels of the hierarchical network, a domain name service (DNS) configuration manager for determining when an incoming piece of data from another API gateway service on another network level of the hierarchical network corresponds to an external service, a messaging publication and subscription list that includes which control messages to read from a control message queue, and/or a resource control plane that includes an automatically updated list of authorized endpoints for services running on the lower network level of the hierarchical network In certain implementations, the act 810 includes onboarding a plurality of network levels from the hierarchical network to a cloud computing system by adding a remote management service agent to the top network level; receiving, from the cloud computing system, a control message to add a new endpoint for the service on the lower network level; and/or in response to receiving the control message, automatically adding the new endpoint at the first gateway service on the lower network level and the second gateway service on the top network level. In additional implementations, the act 810 includes utilizing a computing device on the cloud computing system to view, inspect, or observe updated data of the service on the lower network level of the hierarchical network by passing the updated data through gateway services at different network levels of the hierarchical network.

As further shown, the series of acts 800 includes an act 820 of detecting a request from a service on a lower network level of the hierarchical network to send data to an external computing device. For instance, in example implementations, the act 820 involves detecting a request from a service on the lower network level to send data (e.g., output data or a data request) to an external computing device that is not part of the hierarchical network.

As also shown, the series of acts 800 includes an act 830 of automatically adding an endpoint for the external computing device to gateway services on the lower network level and the top network level. For instance, in example implementations, the act 830 involves, in response to the request, adding an endpoint corresponding to the external computing device to a first gateway service on the lower network level and receiving, from the first gateway service, a control message at a second gateway service on the top network level to automatically add the endpoint. In one or more implementations, adding the endpoint to the first gateway service on the lower network level includes adding the endpoint to the automatically updated list of authorized endpoints on the resource control plane.

As shown, the series of acts 800 additionally includes an act 840 of providing the data from the gateway service on the lower network level to the gateway service on the top network level. For instance, in example implementations, the act 840 involves providing the data from the second gateway service to the external computing device via a second secure connection. In various implementations, the act 840 includes resolving, at the first gateway service, the data to an ingress controller at the second gateway service. In some implementations, the first secure connection includes a transport layer security (TLS) secure connection between the first gateway service and the second gateway service that utilizes signed certificates.

Additionally, as shown, the series of acts 800 includes an act 850 of providing the data from the gateway service on the top network level to the external computing device. For instance, in example implementations, the act 850 involves providing the data from the second gateway service to the external computing device via a second secure connection.

In one or more implementations, the act 850 includes receiving the data at the ingress controller at the second gateway service, determining that the data has the external computing device as a destination, and/or replacing an ingress endpoint with a host name of the external computing device (e.g., an external destination).

Additionally, the series of acts 800 can include additional (or different) acts. For example, in some implementations, the series of acts 800 includes the acts of detecting a modification of the endpoint by the service on the lower network level and, in response to the modification, automatically updating the endpoint at the first gateway service on both the lower network level and the second gateway service on the top network level. In various implementations, the series of acts 800 includes the acts of detecting the service removing the endpoint on the lower network level and, in response to removing the endpoint, automatically and without additional user input, automatically and without additional user input, removing the endpoint at the first gateway service on the lower network level and the second gateway service on the top network level.

In various implementations, the series of acts 800 includes an act of utilizing an application programming interface gateway service (API gateway service) on a network level of a hierarchical network having a plurality of network levels, where the API gateway service includes an ingress controller for forwarding incoming data between API gateway services on different network levels of the hierarchical network; a domain name service (DNS) configuration manager for determining when an incoming piece of data from another API gateway service on another network level of the hierarchical network corresponds to an external service; a messaging publication and subscription list that includes which control messages to read from a control message queue; and an access management list that includes authorized endpoints for a service on the network level of the hierarchical network.

In additional implementations, the hierarchical network includes a Kubernetes cluster at each network level of the plurality of network levels, the hierarchical network includes an API gateway pod at each network level, and/or a resource control plane that includes the access management list. In further implementations, the ingress controller utilizes a reverse proxy to forward the incoming piece of data to an additional API gateway service on an additional network level of the hierarchical network.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the content service system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Figure 9:
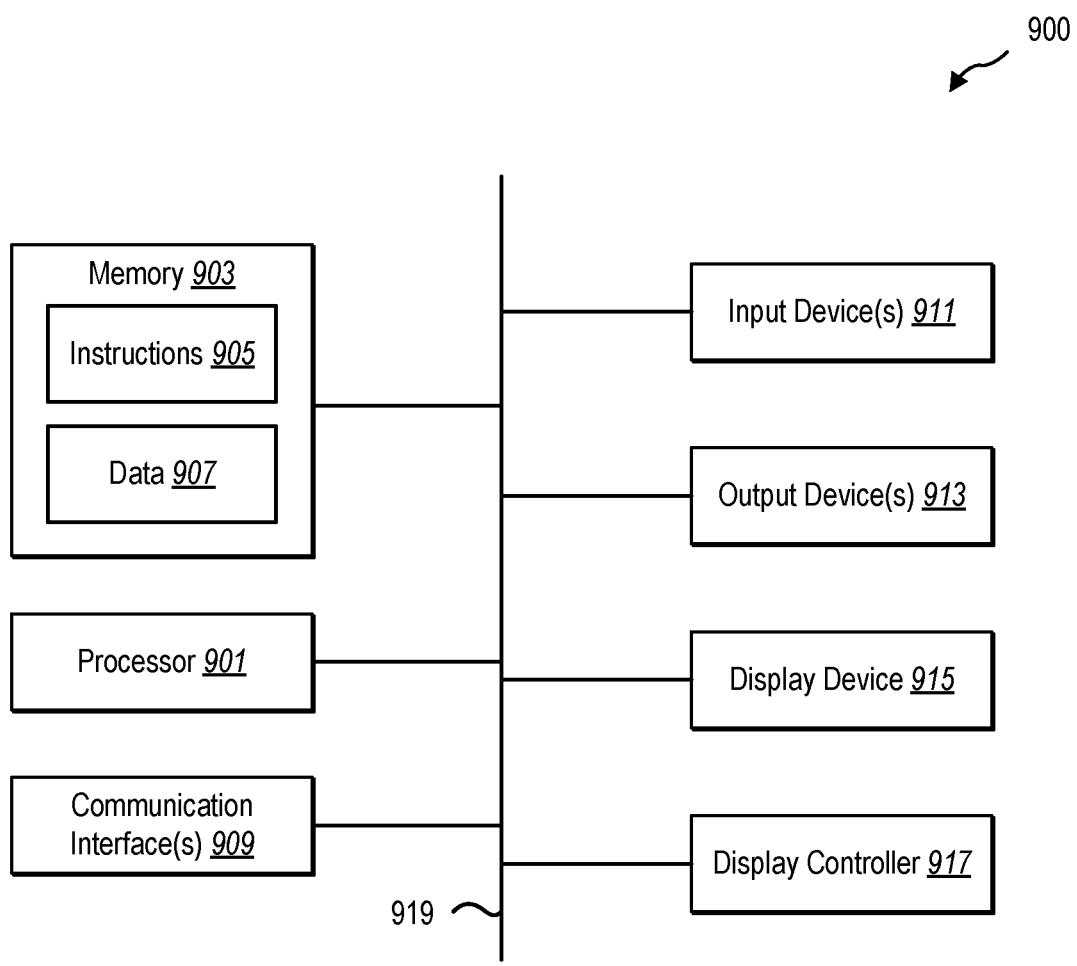
FIG. 9 illustrates example components included within a computer system.

FIG. 9 illustrates certain components that may be included within a computer system 900 (e.g., a computer hardware device). The computer system 900 may be used to implement the various computing devices, components, and systems described herein.

In various implementations, the computer system 900 may represent one or more of the client devices, server devices, or other computing devices that implement the computer hardware device described above. For example, the computer system 900 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface (s) 909 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more busses, which may include a power bus, a control signal bus, a status signal bus, a data bus, etc. For the sake of clarity, the various buses are illustrated in FIG. 9 as a bus system 919.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified.

The term "determining" encompasses a variety of actions. For example, "determining" can include calculating, computing, processing, deriving, investigating, looking up (e.g., looking up in a table, a database, or another data structure), ascertaining, etc. Also, "determining" can include receiving (e.g., receiving information), accessing (e.g., accessing data in a memory), etc. Additionally, "determining" can include resolving, selecting, choosing, establishing, etc.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method comprising:
generating gateway services at multiple levels of a hierarchical network that includes at least a top network level and a lower network level that have isolated networks from each other, where only the top network level communicates with computer devices outside of the hierarchical network;
detecting a request from a service on the lower network level to send data to an external computing device that is outside of the hierarchical network;
in response to the request, adding an endpoint corresponding to the external computing device to a first gateway service on the lower network level;
receiving, from the first gateway service, a control message at a second gateway service on the top network level to automatically add the endpoint; and
providing the data from the first gateway service to the second gateway service via a first secure connection and from the second gateway service to the external computing device via a second secure connection.

2. The computer-implemented method of claim 1, wherein:
the lower network level includes a first Kubernetes cluster that includes the first gateway service as a first application programming interface (API) gateway pod;
the top network level includes a second Kubernetes cluster that includes the second gateway service as a second API gateway pod; and
the first Kubernetes cluster performs different functions than the second Kubernetes cluster.

3. The computer-implemented method of claim 2, wherein the first gateway service comprises:
an ingress controller for forwarding incoming data between API gateway pods on different network levels of the hierarchical network;
a domain name service (DNS) configuration manager for determining when an incoming piece of data from another API gateway service on another network level of the hierarchical network corresponds to an external service;
a messaging publication and subscription list that includes which control messages to read from a control message queue; and
a resource control plane that includes an automatically updated list of authorized endpoints for services running on the lower network level of the hierarchical network.

4. The computer-implemented method of claim 3, wherein adding the endpoint to the first gateway service on the lower network level comprises adding the endpoint to the automatically updated list of authorized endpoints on the resource control plane.

5. The computer-implemented method of claim 1, further comprising:
detecting a modification of the endpoint by the service on the lower network level; and
in response to the modification, automatically updating the endpoint at the first gateway service on the lower network level and the second gateway service on the top network level.

6. The computer-implemented method of claim 1, further comprising:
detecting the service removing the endpoint on the lower network level; and
in response to removing the endpoint, automatically and without additional user input, removing the endpoint at the first gateway service on the lower network level and the second gateway service on the top network level.

7. The computer-implemented method of claim 1, further comprising:
onboarding a plurality of network levels from the hierarchical network to a cloud computing system by adding a remote management service agent to the top network level;
receiving, from the cloud computing system, a control message to add a new endpoint for the service on the lower network level; and
in response to receiving the control message, automatically adding the new endpoint at the first gateway service on the lower network level and the second gateway service on the top network level.

8. The computer-implemented method of claim 7, further comprising utilizing a computing device on the cloud computing system to inspect updated data of the service on the lower network level of the hierarchical network by passing the updated data through gateway services at different network levels of the hierarchical network.

9. The computer-implemented method of claim 1, wherein providing the data generated by the service from the first gateway service to the second gateway service via a first secure connection comprises resolving, at the first gateway service, the data to an ingress controller at the second gateway service.

10. The computer-implemented method of claim 9, wherein providing the data generated by the service from the second gateway service to the external computing device via a second secure connection comprises:
receiving the data at the ingress controller at the second gateway service;
determining that the data has the external computing device as an external destination; and
resolving an ingress endpoint with a host name of the external computing device.

11. The computer-implemented method of claim 1, wherein the first secure connection comprises a transport layer security (TLS) secure connection between the first gateway service and the second gateway service that utilizes signed certificates.

12. The computer-implemented method of claim 1, wherein the hierarchical network adheres to a Purdue Reference Architecture Model.

13. An application programming interface gateway service (API gateway service) stored within memory of a network level of a hierarchical network that includes a plurality of network levels, the API gateway service comprising:
an ingress controller for forwarding incoming data between API gateway services on different network levels of the hierarchical network, the plurality of network levels of the hierarchical network having network isolation from each other;
a domain name service (DNS) configuration manager for determining when an incoming piece of data from another API gateway service on another network level of the hierarchical network corresponds to an external service;
a messaging publication and subscription list that includes which control messages to read from a control message queue; and
an access management list that includes authorized endpoints for a service on the network level of the hierarchical network.

14. The API gateway service of claim 13, wherein:
the hierarchical network includes a Kubernetes cluster at each network level of the plurality of network levels;
the hierarchical network includes an API gateway pod at each network level; and
a resource control plane that comprises the access management list.

15. The API gateway service of claim 13, wherein the ingress controller utilizes a reverse proxy to forward the incoming piece of data to an additional API gateway service on an additional network level of the hierarchical network.

16. A system comprising:
a hierarchical network that includes at least a top network level and a lower network level that have isolated networks from each other, and where only the top network level communicates with computer devices outside of the hierarchical network;
a processor; and
a computer memory including instructions that, when executed by the processor, cause the system to:
detect a request from a service on the lower network level to send data to an external computing device that is not part of the hierarchical network;
in response to the request, adding an endpoint corresponding to the external computing device to a first gateway service on the lower network level;
in response to the request, providing a control message to the top network level to automatically add the endpoint to a second gateway service on the top network level; and
provide the data generated by the service from the first gateway service to the second gateway service via a first secure connection and from the top network level to the external computing device via a second secure connection.

17. The system of claim 16, wherein the lower network level includes a first Kubernetes cluster, and wherein the top network level includes a second Kubernetes cluster that performs different functions than the first Kubernetes cluster.

18. The system of claim 16, further comprising instructions that, when executed by the processor, cause the system to add the first gateway service on the top network level and the second gateway service on the lower network level, where the first gateway service communicates with the second gateway service via secure communications.

19. The system of claim 16, further comprising instructions that, when executed by the processor, cause the system to:
detect a modification of the endpoint by the service on the lower network level; and
in response to detecting the modification, automatically update the endpoint at the first gateway service on the lower network level and the second gateway service on the top network level.

20. The system of claim 16, further comprising instructions that, when executed by the processor, cause the system to:
detect the service removing the endpoint on the lower network level; and
in response to removing the endpoint, automatically remove the endpoint at the first gateway service on the lower network level and the second gateway service on the top network level.

\* \* \* \* \*